US010362010B2

(12) United States Patent
Sharp et al.

(10) Patent No.: US 10,362,010 B2
(45) Date of Patent: Jul. 23, 2019

(54) MANAGEMENT OF CREDENTIALS ON AN ELECTRONIC DEVICE USING AN ONLINE RESOURCE

(71) Applicant: Apple Inc., Cupertino, CA (US)

(72) Inventors: Christopher Sharp, Cupertino, CA (US); David T. Haggerty, Cupertino, CA (US); George R. Dicker, Sunnyvale, CA (US); Glen W. Steele, Cupertino, CA (US); Matthew R. Murphy, Cupertino, CA (US); Timothy S. Hurley, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/475,301

(22) Filed: Sep. 2, 2014

(65) Prior Publication Data

US 2015/0350177 A1    Dec. 3, 2015

Related U.S. Application Data

(60) Provisional application No. 62/004,845, filed on May 29, 2014.

(51) Int. Cl.
*G06Q 20/32* (2012.01)
*G06Q 20/34* (2012.01)
(Continued)

(52) U.S. Cl.
CPC ........... *H04L 63/08* (2013.01); *G06Q 20/322* (2013.01); *G06Q 20/3227* (2013.01); *G06Q 20/3552* (2013.01); *G06Q 20/3572* (2013.01); *G06Q 20/3821* (2013.01); *H04L 63/0823* (2013.01); *H04W 12/06* (2013.01)

(58) Field of Classification Search
None
See application file for complete search history.

(56) References Cited

U.S. PATENT DOCUMENTS

| | | |
|---|---|---|
| 2004/0148259 A1 | 7/2004 | Reiners et al. |
| 2006/0018450 A1 | 1/2006 | Sandberg-Diment |

(Continued)

FOREIGN PATENT DOCUMENTS

| | | | | |
|---|---|---|---|---|
| CA | 2885910 A1 * | 4/2014 | ............ | G06Q 20/00 |
| CN | 102160070 A | 8/2011 | | |

(Continued)

*Primary Examiner* — Fatoumata Traore
(74) *Attorney, Agent, or Firm* — Van Court & Aldridge LLP

(57) ABSTRACT

Systems, methods, and computer-readable media for using an online resource to manage credentials on an electronic device are provided. In one example embodiment, a method, at an electronic device, includes, inter alia, receiving account data via an online resource, accessing commerce credential status data from a secure element of the electronic device, providing initial credential management option data via the online resource based on the received account data and based on the accessed commerce credential status data, in response to the providing, receiving a selection of an initial credential management option via the online resource, and changing the status of a credential on the secure element based on the received selection. Additional embodiments are also provided.

26 Claims, 11 Drawing Sheets

(51) Int. Cl.
  *H04L 29/06*    (2006.01)
  *H04W 12/06*    (2009.01)
  *G06Q 20/38*    (2012.01)

(56) References Cited

U.S. PATENT DOCUMENTS

| | | | |
|---|---|---|---|
| 2008/0010215 | A1 | 1/2008 | Rackley, III et al. |
| 2009/0070272 | A1* | 3/2009 | Jain .................. G06K 19/07739 705/75 |
| 2009/0307132 | A1* | 12/2009 | Phillips ................ G06Q 20/105 705/41 |
| 2010/0274677 | A1* | 10/2010 | Florek .................... G06Q 20/10 705/16 |
| 2011/0087610 | A1* | 4/2011 | Batada .................... G06F 21/72 705/318 |
| 2011/0143663 | A1* | 6/2011 | Renard .................. G06Q 20/32 455/41.1 |
| 2012/0130839 | A1 | 5/2012 | Koh et al. |
| 2012/0136732 | A1* | 5/2012 | McMillen ............ G06Q 20/105 705/16 |
| 2012/0303961 | A1* | 11/2012 | Kean ..................... H04L 9/3234 713/171 |
| 2013/0011546 | A1 | 1/2013 | Izumiya et al. |
| 2013/0111546 | A1* | 5/2013 | Gargiulo ................... H04L 9/32 726/1 |
| 2013/0260734 | A1* | 10/2013 | Jain .................... G06Q 30/0601 455/418 |
| 2014/0249899 | A1* | 9/2014 | Krajicek ............ G06Q 30/0215 705/14.15 |
| 2014/0373170 | A1* | 12/2014 | Brudnicki ............. G06F 21/604 726/27 |
| 2015/0113617 | A1* | 4/2015 | Chastain ................ G06F 21/31 726/6 |

FOREIGN PATENT DOCUMENTS

| | | | | |
|---|---|---|---|---|
| WO | | 00/33497 | 6/2000 | |
| WO | | 2008/052592 | 5/2008 | |
| WO | WO-2013151797 | A1 * | 10/2013 | ............ H04W 12/04 |

* cited by examiner

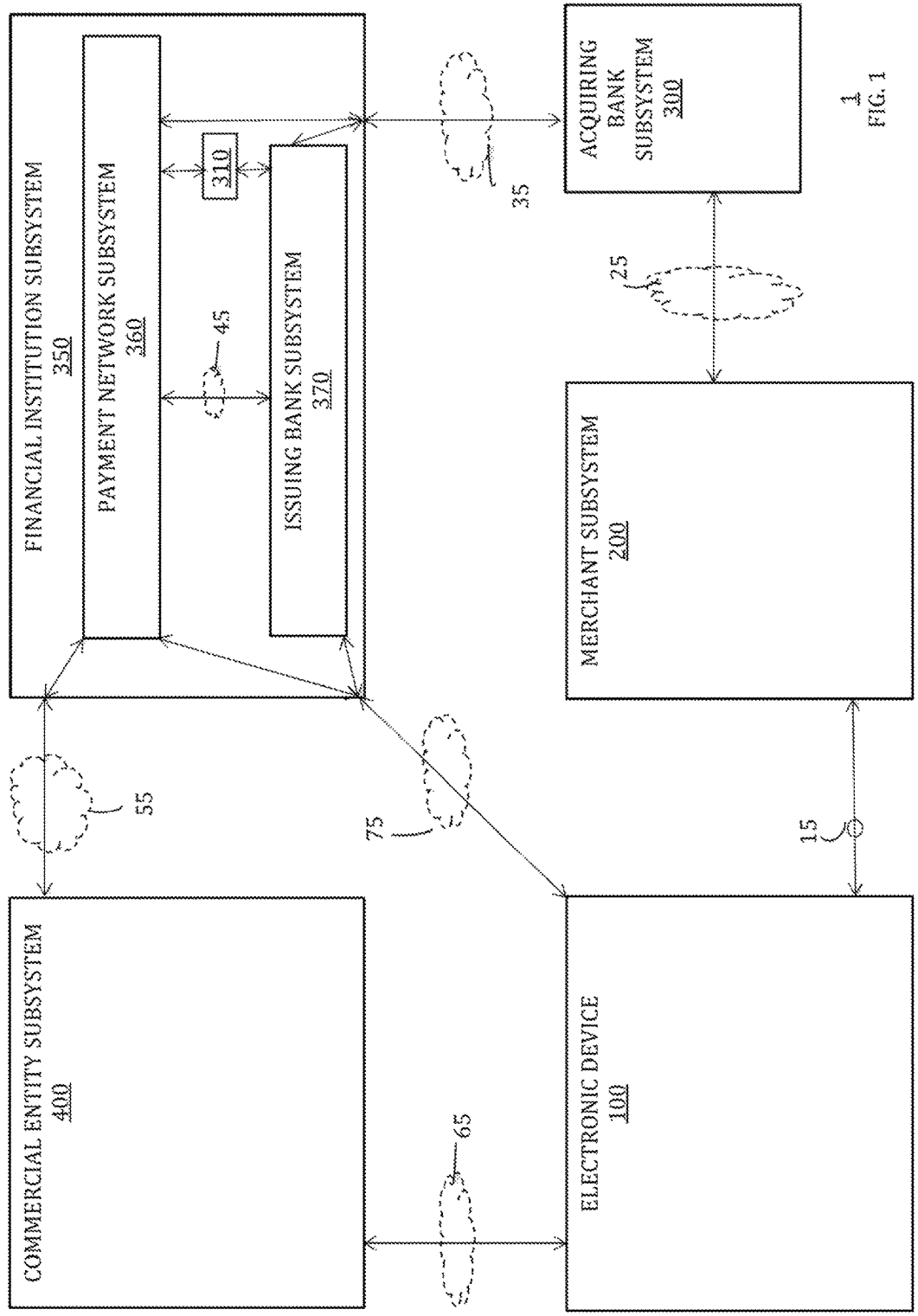

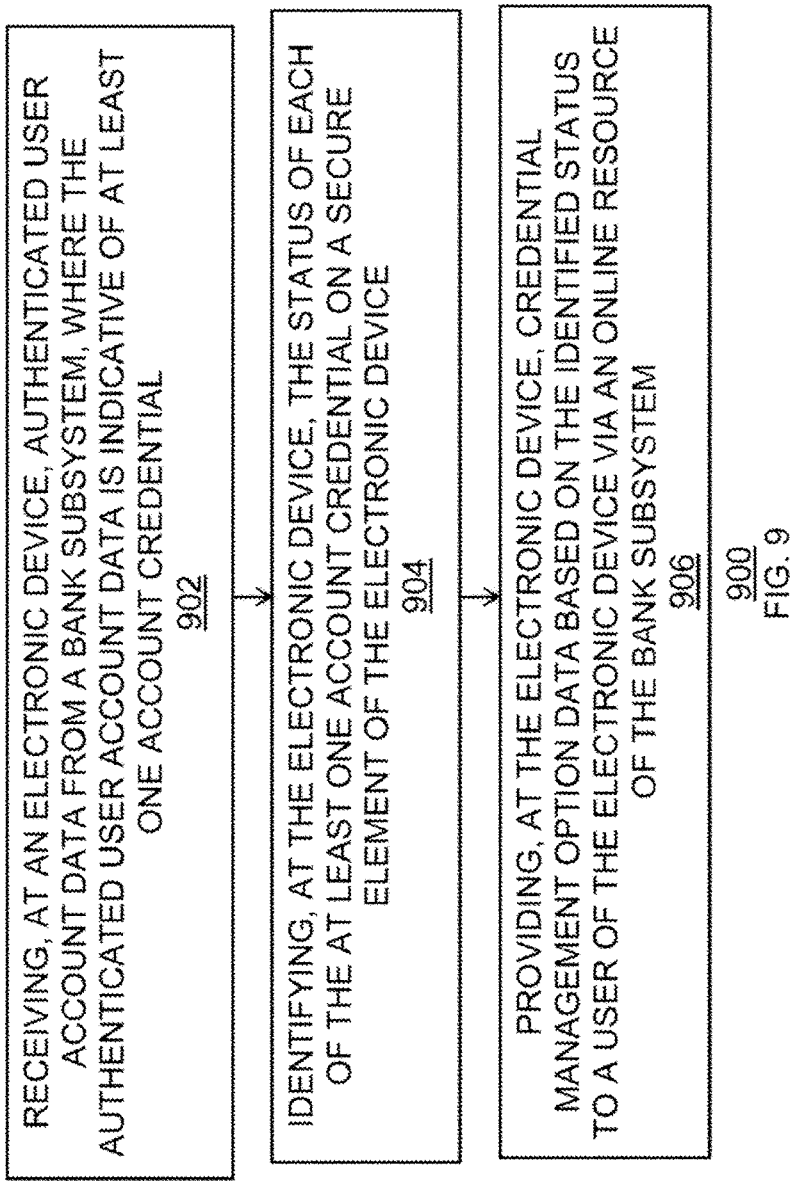

FIG. 10A (190a) — BANK APP

| Account Credentials | Device Status | User Option |
|---|---|---|
| Credential: "A" | Enabled | [Delete] — 1001a |
| Credential: "B" | Disabled | [Enable] — 1001b |
| Credential: "C" | Missing | [Add] — 1001c |

FIG. 10B (190b) — BANK APP

| Account Credentials | Device Status | User Option |
|---|---|---|
| Credential: "A" | Missing | [Add] — 1003a |
| Credential: "B" | Disabled | [Enable] — 1003b |
| Credential: "C" | Missing | [Add] — 1003c |

FIG. 10C (190c) — BANK APP

| Account Credentials | Device Status | User Option |
|---|---|---|
| Credential: "A" | Enabled | [Delete] — 1005a |
| Credential: "B" | Enabled | [Delete] — 1005b |
| Credential: "C" | Missing | [Add] — 1005c |

FIG. 10D (190d) — BANK APP

| Account Credentials | Device Status | User Option |
|---|---|---|
| Credential: "A" | Enabled | [Delete] — 1007a |
| Credential: "B" | Disabled | [Enable] — 1007b |
| Credential: "C" | Enabled | [Delete] — 1007c |

MANAGEMENT OF CREDENTIALS ON AN ELECTRONIC DEVICE USING AN ONLINE RESOURCE

CROSS-REFERENCE TO RELATED APPLICATION

This application claims the benefit of prior filed U.S. Provisional Patent Application No. 62/004,845, filed May 29, 2014, which is hereby incorporated by reference herein in its entirety.

TECHNICAL FIELD

This disclosure relates to the management of credentials on an electronic device and, more particularly, to the management of credentials on an electronic device using an online resource.

BACKGROUND OF THE DISCLOSURE

Portable electronic devices (e.g., cellular telephones) may be provided with near field communication ("NFC") components for enabling contactless proximity-based communications with another entity. Often times, these communications are associated with financial transactions or other secure data transactions that require the electronic device to access and share a commerce credential, such as a credit card credential, with the other entity in a contactless proximity-based communication. However, secure provisioning of such a commerce credential on the electronic device using an online resource has heretofore been infeasible.

SUMMARY OF THE DISCLOSURE

This document describes systems, methods, and computer-readable media for using an online resource to manage credentials on an electronic device.

As an example, a method may include, at an electronic device, receiving account data via an online resource, accessing commerce credential status data from a secure element of the electronic device, providing initial credential management option data via the online resource based on the received account data and based on the accessed commerce credential status data, in response to the providing, receiving a selection of an initial credential management option via the online resource, and changing the status of a credential on the secure element based on the received selection.

As another example, an electronic device may include a communication component, an application processor operative to access an online resource of a bank server, and a secure element operative to store commerce credential data. The application processor may be operative to receive account data from the bank server via the communication component, to obtain status data for each commerce credential of the commerce credential data from the secure element, to provide initial credential management option data via the online resource based on the received account data and based on the obtained status data, and to receive a selection of an initial credential management option of the provided initial credential management option data via the online resource. The secure element may be operative to change the status of a commerce credential of the commerce credential data on the secure element based on the received selection.

As another example, a method may include, at a bank server subsystem, receiving authentication data from an electronic device, authenticating a user account of the bank server subsystem based on the received authentication data, transmitting user account data indicative of at least one account credential of the authenticated user account to the electronic device, receiving request data indicative of a device status of the at least one account credential on the electronic device, and transmitting response data for changing the device status of the at least one account credential on the electronic device.

As yet another example, a method may include, at an electronic device including a secure element, receiving authenticated user account data from a bank subsystem, where the authenticated user account data is indicative of at least one account credential, identifying the status of each of the at least one account credential on the secure element, and providing credential management option data based on the identified status to a user of the electronic device via an online resource of the bank subsystem.

As yet another example, a non-transitory computer-readable medium may include computer-readable instructions recorded thereon for receiving authenticated user account data at an electronic device from a bank subsystem, where the authenticated user account data is indicative of at least one account credential, identifying the status of each of the at least one account credential on a secure element of the electronic device, and providing credential management option data based on the identified status to a user of the electronic device.

As yet another example, a method may include, at an electronic device, comparing account data received from an online resource running on the electronic device with commerce credential data stored on a secure element of the electronic device, and providing at least one commerce credential management option to a user of the electronic device based on the comparing.

As yet another example, a method may include receiving user authentication data from a user with an online resource running on the electronic device, receiving user selection data from the user for a commerce credential management option with the online resource running on the electronic device, where the commerce credential management option is based on the received user authentication data, and adding a new commerce credential to a secure element of the electronic device in response to the received user selection data.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 1 is a schematic view of an illustrative system for using an online resource to manage credentials on an electronic device;

FIGS. 5-9 are flowcharts of illustrative processes for using an online resource to manage credentials on an electronic device; and FIGS. 10A-10D are front views of screens of a graphical user interface of the electronic device of FIGS. 1-4 illustrating processes for using an online resource to manage credentials on the electronic device.

DETAILED DESCRIPTION OF THE DISCLOSURE

A commerce credential provisioned and enabled on a secure element of an electronic device may be used for defining a contactless proximity-based communication (e.g., a near field communication) for facilitating a financial transaction between the electronic device and a merchant. When a user of such an electronic device authenticates itself with an account of a bank subsystem via an online resource running on the electronic device (e.g., via an online application or a website that may be managed or otherwise at least partially controlled by the bank subsystem), the device may receive suitable account information indicative of one or more account credentials of that authenticated account. Next, the electronic device may determine the status of each account credential with respect to each commerce credential on the secure element of the electronic device in order to provide at least one credential management option to a user of the device (e.g., via a user interface of the online resource) for changing the determined status of at least one account credential. In response to user selection of such a credential management option, the electronic device may interact with the bank subsystem and/or any other suitable system entities in order to facilitate the selected status change of at least one commerce credential on the secure element, such as to enable a disabled commerce credential of the secure element, to add a new commerce credential on the secure element, and/or to remove a commerce credential from the secure element. After such a change has occurred, the electronic device may provide at least one updated credential management option to a user of the device (e.g., via a user interface of the online resource) for reflecting the commerce credential status change of the secure element. Therefore, the electronic device may provide a more seamless user experience when a user is interfacing with or otherwise using an online resource on the electronic device, where that online resource may be associated with one or more account credentials of an authenticated user account that have already been at least partially provisioned on the device and/or that may be able to be at least partially provisioned on the device. Such management of one or more credentials on a secure element of an electronic device through user interaction with an online resource may increase the functionality of the online resource and/or enhance a user's experience with the electronic device and its credential management abilities.

Figure 1A:
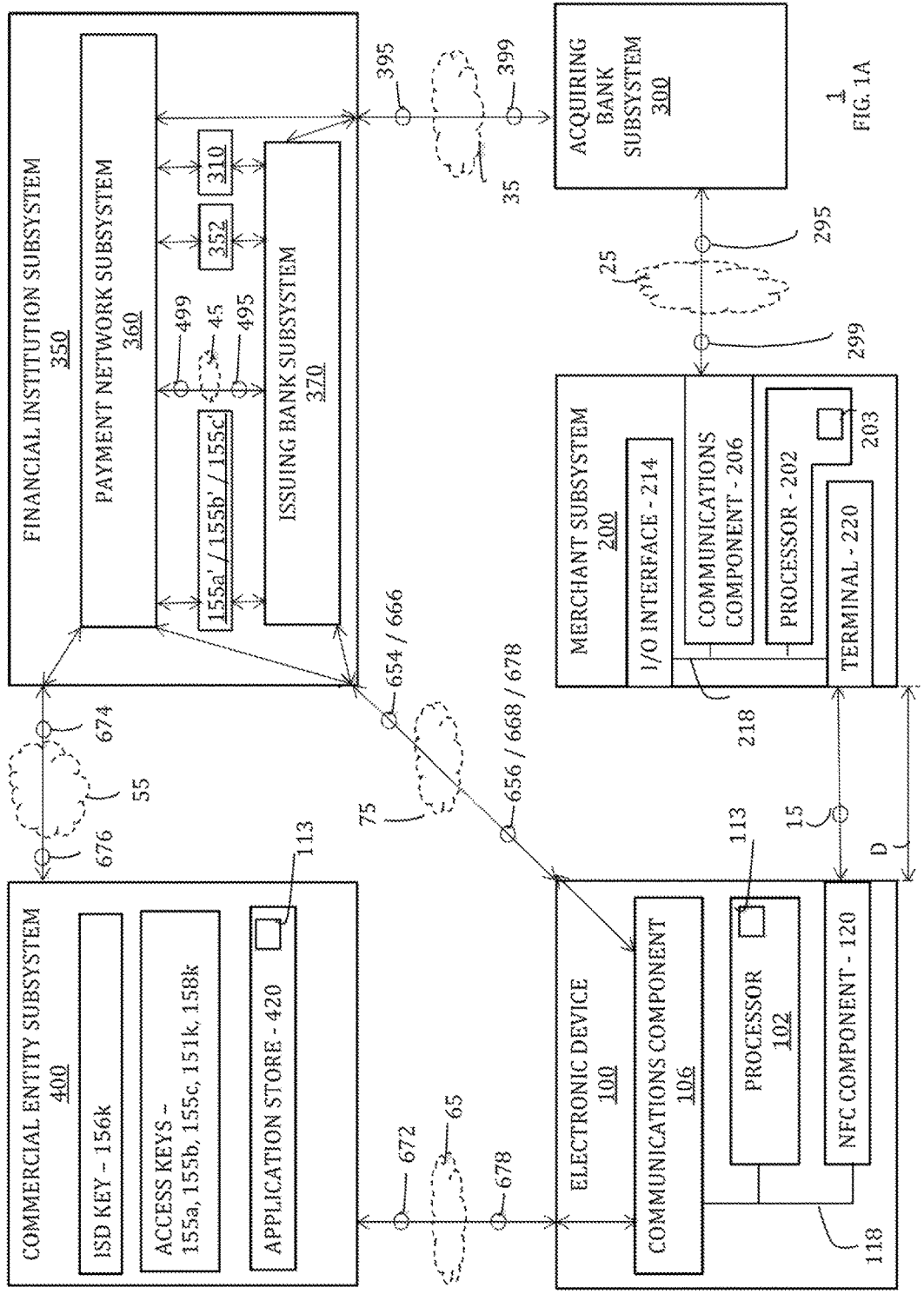
FIG. 1A is another more detailed schematic view of the system of FIG. 1.
Figure 2:
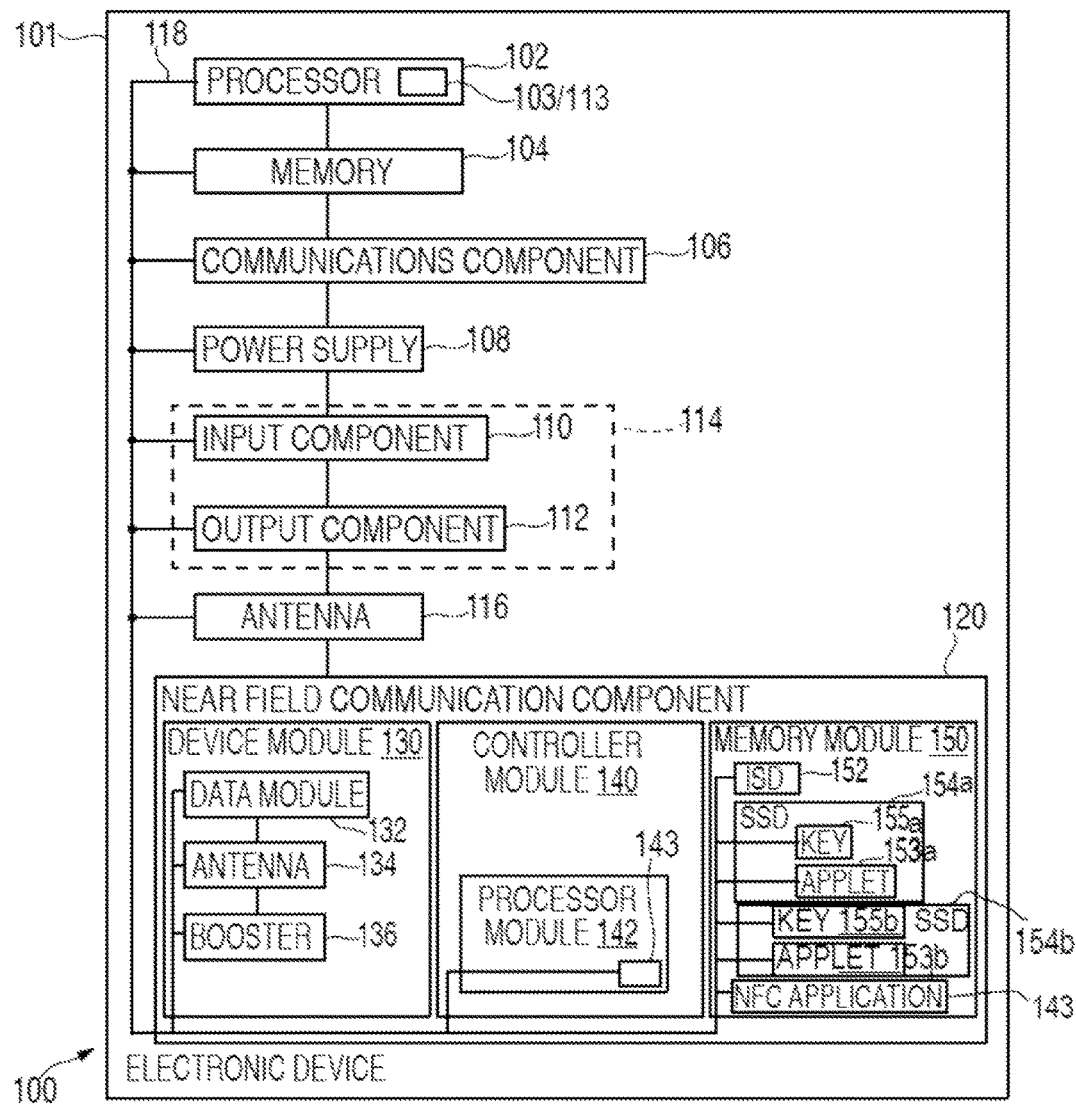
FIG. 2 is a more detailed schematic view of the electronic device of the system of FIGS. 1 and 1A.
Figure 3:
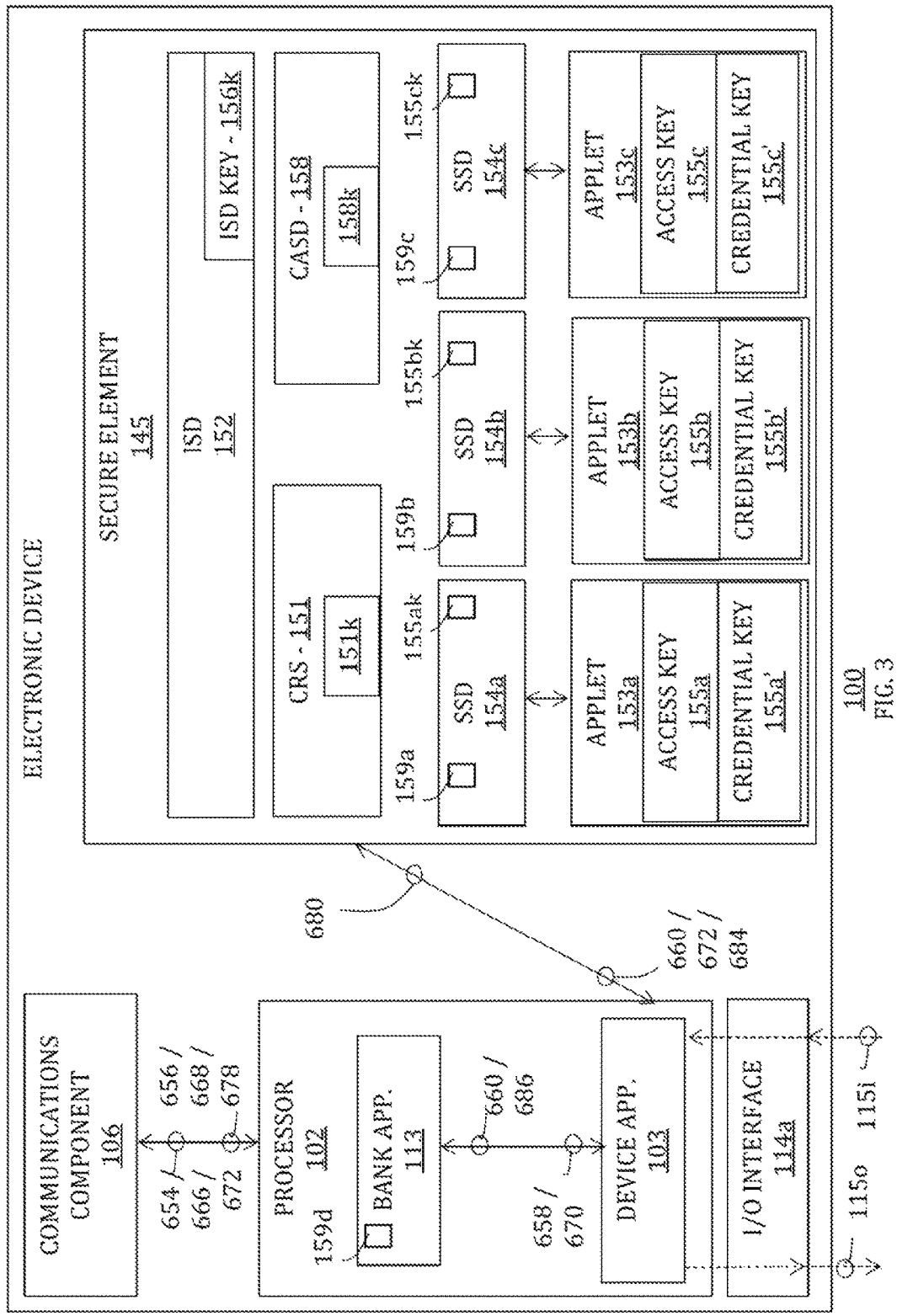
FIG. 3 is another more detailed schematic view of the electronic device of FIGS. 1-2.
Figure 4:
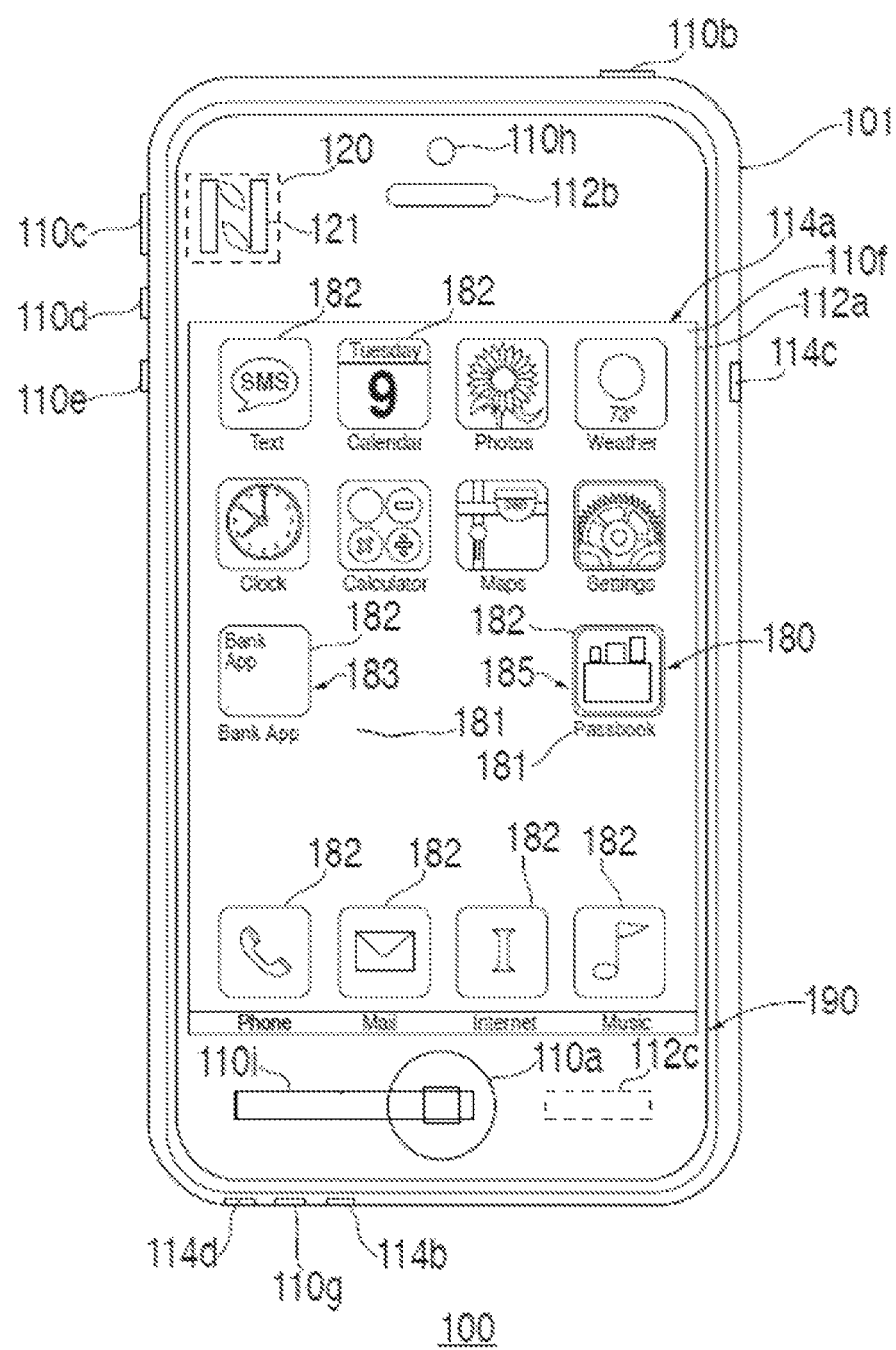
FIG. 4 is a front view of the electronic device of FIGS. 1-3.

FIGS. 1 and 1A show a system 1 in which one or more credentials may be provisioned onto an electronic device 100 from a financial institution subsystem 350 in conjunction with a commercial entity subsystem 400 using an online resource, and in which such credentials may be used by electronic device 100 for conducting a financial transaction with a merchant subsystem 200 and an associated acquiring bank subsystem 300. FIGS. 2-4 show further details with respect to particular embodiments of electronic device 100 of system 1, FIGS. 5-9 are flowcharts of illustrative processes for using an online resource to manage credentials on an electronic device, and FIGS. 10A-10D show example screens 190a-190d that may be representative of a graphical user interface of electronic device 100 during such credential management.

Description of FIG. 1

FIG. 1 is a schematic view of an illustrative system 1 that may allow for the provisioning of a credential onto an electronic device using an online resource. For example, as shown in FIG. 1, system 1 may include an end-user electronic device 100 as well as a commercial entity subsystem 400 and a financial institution subsystem 350 for securely provisioning one or more credentials on electronic device 100 using an online resource (e.g., an online application or a website that may be managed or otherwise at least partially controlled by a server 310 and that may be accessed by electronic device 100). Moreover, as shown in FIG. 1, system 1 may also include a merchant subsystem 200 for receiving contactless proximity-based communications 15 (e.g., near field communications) from electronic device 100 for enabling payments between a user of electronic device 100 and a merchant of merchant subsystem 200 based on such a provisioned credential. System 1 may also include an acquiring bank subsystem 300 that may utilize such contactless proximity-based communications 15 received by merchant subsystem 200 for completing a financial transaction with financial institution subsystem 350.

System 1 may include a communications path 25 for enabling communication between merchant subsystem 200 and acquiring bank subsystem 300, a communications path 35 for enabling communication between acquiring bank subsystem 300 and financial institution subsystem 350, a communications path 45 for enabling communication between a payment network subsystem 360 of financial institution subsystem 350 and an issuing bank subsystem 370 of financial institution subsystem 350, a communications path 55 for enabling communication between financial institution subsystem 350 and commercial entity subsystem 400, a communications path 65 for enabling communication between commercial entity subsystem 400 and electronic device 100, and a communications path 75 for enabling communication between financial institution subsystem 350 and electronic device 100. One or more of paths 25, 35, 45, 55, 65, and 75 may be at least partially managed by one or more trusted service managers ("TSMs"). Any suitable circuitry, device, system, or combination of these (e.g., a wireless communications infrastructure including one or more communications towers, telecommunications servers, or the like) operative to create a communications network may be used to provide one or more of paths 25, 35, 45, 55, 65, and 75, which may be capable of providing communications using any suitable wired or wireless communications protocol. For example, one or more of paths 25, 35, 45, 55, 65, and 75 may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

Description of FIG. 1A

Referring now to FIG. 1A, FIG. 1A shows a more detailed view of the system 1 described above with respect to FIG. 1. As shown in FIG. 1A, for example, electronic device 100 may include a processor 102, a communications component 106, and/or a near field communication ("NFC") component 120. NFC component 120 may include a secure element that may be configured to provide a tamper-resistant platform (e.g., as a single or multiple chip secure microcontroller) that may be capable of securely hosting applications and their confidential and cryptographic data (e.g., supplemental security domains ("SSDs") with credential applets, associated credential keys (e.g., credential keys 155a'-155c', which may also be available to financial institution subsystem 350, as shown in FIG. 1A), and associated access keys (e.g., access keys 155a-155c, which may also be available to commercial entity subsystem 400 as shown in FIG. 1A), an issuer security domain ("ISD") key (e.g., ISD key 156k which may also be available to commercial entity subsystem 400 as shown in FIG. 1A), a contactless registry services ("CRS") access kit (e.g., CRS access kit 151k, which may also be available to commercial entity subsystem 400 as shown in FIG. 1A), and/or a controlling authority security domain ("CASD") access kit (e.g., CASD access kit 158k, which may also be available to commercial entity subsystem 400 as shown in FIG. 1A), one or more of which may be in accordance with rules and security requirements that may be set forth by a set of well-identified trusted authorities (e.g., an authority of financial institution subsystem and/or an industry standard, such as GlobalPlatform). As described below in more detail, a credential applet of NFC component 120 may be configured to provide sufficient detail for identifying a funding account or other financial instrument or credit source, where information from such a credential applet may be used by electronic device 100 in one or more communications with merchant subsystem 200 for facilitating a financial transaction. NFC component 120 may be configured to communicate such credential information as a contactless proximity-based communication 15 (e.g., near field communication) with merchant subsystem 200 (e.g., with a merchant terminal 220 of merchant subsystem 200) to conduct a financial transaction. Alternatively or additionally, communications component 106 may be provided to allow device 100 to communicate any suitable data (e.g., credential information) with one or more other electronic devices or servers or subsystems (e.g., one or more subsystems or other components of system 1) using any suitable wired or wireless protocol (e.g., via one or more of communications paths 55, 65, and/or 75). Processor 102 of electronic device 100 may include any processing circuitry that may be operative to control the operations and performance of one or more components of electronic device 100. For example, processor 102 may be configured to run one or more applications on device 100 (e.g., an online resource or bank application 113) that may at least partially dictate the way in which one or more credentials may be managed on a secure element of NFC component 120 and/or credential data may be communicated between communications component 106 of device 100 and other entities of system 1 (e.g., a bank server 310, commercial entity subsystem 400, and/or financial entity subsystem 350) over the internet or any other suitable network that may be provided by communications paths 65 and/or 75.

As mentioned, merchant subsystem 200 may include a reader or terminal 220 for detecting, reading, or otherwise receiving NFC communications 15 from electronic device 100 (e.g., when electronic device 100 comes within a certain distance or proximity D of terminal 220). Merchant terminal 220 may be located at a brick and mortar store or any physical location at which a user of electronic device 100 may use a credential stored on NFC component 120 of electronic device 100 to conduct a financial transaction with a proximately located merchant terminal 220 via a contactless proximity-based communication 15. As also shown in FIG. 1A, and as described below in more detail, merchant subsystem 200 may also include a merchant processor component 202 that may be the same as or similar to a processor component 102 of electronic device 100, a merchant application 203 that may be the same as or similar to an application 113 of electronic device 100, a merchant communications component 206 that may be the same as or similar to a communications component 106 of electronic device 100, a merchant input/output ("I/O") interface 214 that may be the same as or similar to an I/O interface of electronic device 100, a merchant bus 218 that may be the same as or similar to a bus of electronic device 100, a merchant memory component (not shown) that may be the same as or similar to a memory component of electronic device 100, and/or a merchant power supply component (not shown) that may be the same as or similar to a power supply component of electronic device 100.

Financial institution subsystem 350 may include a payment network subsystem 360 (e.g., a payment card association or a credit card association) and/or an issuing bank subsystem 370. For example, issuing bank subsystem 370 may be a financial institution that may assume primary liability for a consumer's capacity to pay off debts they may incur with a specific credential. Each specific credential applet of NFC component 120 may be associated with a specific payment card that may be electronically linked to an account or accounts of a particular user at financial institution subsystem 350. Various types of payment cards are suitable, including credit cards, debit cards, charge cards, stored-value cards, fleet cards, gift cards, and the like. The commerce credential of a specific payment card may be provisioned on electronic device 100 (e.g., as a credential of a credential SSD of NFC component 120, as described below) by financial institution subsystem 350 for use in a commerce credential data communication (e.g., a contactless proximity-based communication 15) with merchant subsystem 200. Each credential may be a specific brand of payment card that may be branded by a payment network subsystem 360. Payment network subsystem 360 may be a network of various issuing banks 370 and/or various acquiring banks that may process the use of payment cards (e.g., commerce credentials) of a specific brand.

When a credential of a secure element of device 100 is appropriately provided as a commerce credential data communication to merchant subsystem 200 (e.g., as a contactless proximity-based communication 15 to merchant terminal 220), merchant subsystem 200 may leverage acquiring bank subsystem 300 and/or financial institution subsystem 350 for completing a financial transaction based on that commerce credential data communication. For example, after a user of electronic device 100 has chosen a product for purchase and has appropriately enabled a specific credential of device 100 to be used for payment, merchant subsystem 200 may receive an appropriate commerce credential data communication 15 indicative of commerce credential data for the specific credential. Based on such a received commerce credential data communication 15, merchant subsystem 200 may be configured to generate and transmit data 295 to acquiring bank subsystem 300 (e.g., via a communication path 25 between merchant subsystem 200 and acquiring bank subsystem 300), where data 295 may include payment information and an authorization request that may be indicative of the user's commerce credential and the merchant's purchase price for the product or service. Also known as a payment processor or acquirer, acquiring bank subsystem 300 may be a banking partner of the merchant associated with merchant subsystem 200, and acquiring bank subsystem 300 may be configured to work with financial institution subsystem 350 to approve and settle credential transactions attempted by electronic device 100 via a commerce credential data communication with merchant subsystem 200 (e.g., via a contactless proximity-based communication 15). Acquiring bank subsystem 300 may then forward the authorization request from data 295 to financial institution subsystem 350 as data 395 (e.g., via a communication path 35 between acquiring bank subsystem 300 and financial institution subsystem 350).

Payment network subsystem 360 and issuing bank subsystem 370 may be a single entity or separate entities. For example, American Express may be both a payment network subsystem 360 and an issuing bank subsystem 370. In contrast, Visa and MasterCard may be payment networks 360, and may work in cooperation with issuing banks 370, such as Chase, Wells Fargo, Bank of America, and the like. Financial institution subsystem 350 may also include one or more acquiring banks, such as acquiring bank subsystem 300. For example, acquiring bank subsystem 300 may be the same entity as a payment network subsystem 360 and/or an issuing bank subsystem 370. One, some, or all components of acquiring bank subsystem 300 may be implemented using one or more processor components, which may be the same as or similar to processor component 102 of device 100, one or more memory components, which may be the same as or similar to a memory component of device 100, and/or one or more communications components, which may be the same as or similar to communications component 106 of device 100. One, some, or all components of payment network subsystem 360 may be implemented using one or more processor components, which may be the same as or similar to processor component 102 of device 100, one or more memory components, which may be the same as or similar to a memory component of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to a memory component of device 100, and/or one or more communications components, which may be the same as or similar to communications component 106 of device 100. In the case of payment network subsystem 360 and issuing bank subsystem 370 being separate entities, payment network subsystem 360 may receive the authorization request of data 395 from acquiring bank subsystem 300 and may then forward the request to issuing bank subsystem 370 as data 495 (e.g., via a communication path 45 between payment network subsystem 360 and issuing bank subsystem 370). In the case of payment network subsystem 360 and issuing bank subsystem 370 being the same entity, acquiring bank subsystem 300 may submit the authorization request of data 395 directly to issuing bank subsystem 370. Furthermore, payment network subsystem 360 may respond to acquiring bank subsystem 300 on behalf of issuing bank subsystem 370 (e.g., according to conditions agreed upon between payment network subsystem 360 and issuing bank subsystem 370). By interfacing between acquiring bank subsystem 300 and issuing bank subsystem 370, payment network subsystem 360 may reduce the number of entities that each acquiring bank subsystem 300 and each issuing bank subsystem 370 may have to interact with directly. That is, to minimize direct integration points of financial institution subsystem 350, payment network subsystem 360 may act as an aggregator for various issuing banks 370 and/or various acquiring banks 300. Financial institution subsystem 350 may also include one or more acquiring banks, such as acquiring bank subsystem 300. For example, acquiring bank subsystem 300 may be the same entity as issuing bank subsystem 370.

When issuing bank subsystem 370 receives an authorization request (e.g., directly from acquiring bank subsystem 300 as data 395 or indirectly via payment network subsystem 360 as data 495), the payment information (e.g., commerce credential information of device 100) and the purchase amount included in the authorization request may be analyzed to determine if the account associated with the commerce credential has enough credit to cover the purchase amount. If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response data 399 (e.g., authorization response data 399 may be provided directly from issuing bank subsystem 370 to acquiring bank subsystem 300 via communication path 35, or authorization response data 399 may be provided from payment network subsystem 360 to acquiring bank subsystem 300 based on authorization response data 499 that may be provided to payment network subsystem 360 from issuing bank subsystem 370 via communication path 45). Appropriate authorization response data 299 may be generated and transmitted by acquiring bank subsystem 300 to merchant subsystem 200 (e.g., via communications path 25) based on authorization response data 399 so as to alert merchant subsystem 200 of the status of the financial transaction.

In order for such financial transactions to occur within system 1, at least one commerce credential must first be securely provisioned on a secure element of electronic device 100 (e.g., as a portion of a credential SSD of NFC component 120). For example, such a commerce credential may be at least partially provisioned on a secure element of NFC component 120 of electronic device 100 directly from financial institution subsystem 350 (e.g., as credential pass data 678 via a communication path 75 between financial institution subsystem 350 and device 100, which may be passed to NFC component 120 via communications component 106). Additionally or alternatively, such a commerce credential may be at least partially provisioned on a secure element of NFC component 120 of electronic device 100 from financial institution subsystem 350 via commercial entity subsystem 400 (e.g., as credential pass data 678 via a communication path 55 between financial institution subsystem 350 and commercial entity subsystem 400, which may then be passed to device 100 as credential pass data 678 via a communication path 65 between a server of commercial entity subsystem 400 and communications component 106 of device 100, which may then be passed to NFC component 120 from communications component 106). Credential pass data 678 via path 75 and/or via path 65 may be provisioned on a secure element of device 100 as at least a portion or all of a credential SSD and may include a credential applet and/or a credential key, as described below in more detail. Financial institution subsystem 350 may also have access to a credential key for each credential it provisions (e.g., credential key 155a', 155b', and/or 155c', as shown in FIG. 1A, for decrypting data that may encrypted by device 100 using its version of that credential key). Financial institution subsystem 350 may be responsible for management of credential keys 155a'-155c', which may include the generation, exchange, storage, use, and replacement of such keys. Financial institution subsystem 350 may store its version of each credential key 155a'-155c' in a secure element of financial institution subsystem 350.

The credential data that may be provisioned on device 100 may include all data necessary to make a payment with that credential, such as, for example, a primary account number ("PAN"), a card security code (e.g., a card verification code ("CVV")), expiration date, name associated with the credential, and/or the like. A "virtual" credential or virtual PAN or device PAN ("D-PAN") may be provisioned on device 100 rather than the user's "actual" credential or actual PAN or funding PAN ("F-PAN"). For example, once it is determined that a credential is to be provisioned on device 100, it may be requested (e.g., by financial institution subsystem 350, by commercial entity subsystem 400, by server 310, and/or by a user of device 100) that a virtual credential be generated, linked to the actual credential, and provisioned on device 100 instead of the actual credential. Such creation and linking of a virtual credential with an actual credential may be performed by any suitable component of financial institution subsystem 350. For example, a payment network subsystem 360 (e.g., a particular payment network subsystem 360 that may be associated with the brand of the actual credential) may define and store a virtual-linking table 352 (e.g., as shown in FIG. 1A) that may create associations between the actual credential and a virtual credential, such that anytime a virtual credential is utilized by device 100 for a financial transaction with merchant subsystem 200 (e.g., after being provisioned on device 100), payment network subsystem 360 may receive an authorization request indicative of that virtual credential (e.g., as data 395 of FIG. 1A) and may conduct an analysis of that authorization request in light of the actual credential associated with the virtual credential as determined by table 352. By provisioning a virtual credential on device 100 rather than an actual credential, financial institution subsystem 350 may be configured to limit the fraudulent activity that may result when the virtual credential is intercepted by an unauthorized user, as payment network subsystem 360 may only be configured to utilize table 352 for linking the virtual credential to the actual credential during certain transactions.

Commercial entity subsystem 400 may be provided as an intermediary between electronic device 100 and financial institution subsystem 350, where commercial entity subsystem 400 may be configured to provide a new layer of security and/or to provide a more seamless user experience when a credential is being provisioned or otherwise managed on a secure element of device 100. Commercial entity subsystem 400 may be provided by a specific commercial entity that may offer various services to a user of device 100, for example, via user-specific log-in information to a user-specific account with that commercial entity (e.g., via user-specific identification and password combinations). As just one example, commercial entity subsystem 400 may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.), and which may also be a provider, manufacturer, and/or developer of device 100 itself (e.g., when device 100 is an iPod™, iPad™ iPhone™, or the like). The commercial entity that may provide commercial entity subsystem 400 (e.g., Apple Inc.) may be distinct and independent from any financial entity of financial institution subsystem 350. For example, the commercial entity that may provide commercial entity subsystem 400 may be distinct and independent from any entity that may furnish or otherwise mange bank server 310, any entity that may furnish or otherwise manage third party application 113, any entity that may furnish or otherwise mange payment network subsystem 360, and/or any entity that may furnish or otherwise mange issuing bank subsystem 370, which may furnish and/or manage any credit card or other commerce credential provisioned on user device 100. Additionally or alternatively, the commercial entity that may provide commercial entity subsystem 400 (e.g., Apple Inc.) may be distinct and independent from any merchant of merchant subsystem 200. For example, the commercial entity that may provide commercial entity subsystem 400 may be distinct and independent from any merchant of merchant subsystem 200 that may provide terminal 220 or any other aspect of merchant subsystem 200. Such a commercial entity may leverage its potential ability to configure or control various components of device 100 (e.g., software and/or hardware components of device 100 when that commercial entity at least partially produces or manages device 100) in order to provide a more seamless user experience for a user of device 100 when he or she wants to provision or otherwise manage a credential offered by financial institution subsystem 350 on user device 100. For example, in some embodiments, device 100 may be configured to communicate with commercial entity subsystem 400 seamlessly and transparently to a user of device 100 (e.g., via communications path 65) for sharing or receiving certain data that may enable a higher level of security (e.g., during provisioning or other suitable management of one or more credentials on a secure element of device 100, for example, while using an online resource, such as application 113).

As mentioned, in addition to at least one commerce credential being provisioned on a secure element of electronic device 100 (e.g., as a portion of an SSD credential of NFC component 120), an issuer security domain ("ISD") may also be provisioned on a secure element of device 100 in order to more securely enable device 100 to conduct a financial transaction with merchant subsystem 200. For example, an ISD with an ISD key may be at least partially provisioned on a secure element of NFC component 120 of electronic device 100. As shown in FIG. 1A, commercial entity subsystem 400 may also have access to ISD key 156k (e.g., for decrypting data encrypted by device 100 using its ISD key). Commercial entity subsystem 400 may be responsible for management of ISD key 156k, which may include the generation, exchange, storage, use, and replacement of such a key. Commercial entity subsystem 400 may store its version of ISD key 156k in a secure element of commercial entity subsystem 400. An ISD key of an ISD of NFC component 120 may be leveraged to provide increased encryption to financial transaction data that may be communicated outside of the secure element of device 100.

As shown in FIG. 1A, system 1 may include a bank server 310 that may manage or otherwise at least partially control content communicated with device 100 via an online resource, such as third party application 113. For example, in some embodiments, as shown, bank server 310 may be provided by financial institution subsystem 350 of FIG. 1A, although, in other embodiments, bank server 310 may be provided by any other suitable subsystem or entity of system 1 and/or may be an independent entity in an independent subsystem of system 1. Bank server 310 may include any suitable component or subsystem that may be configured to communicate any suitable online-based communication data (e.g., data 654, 656, 666, and/or 668) with communications component 106 of electronic device 100 (e.g., via communications path 75). Such online-based communication may be configured to communicate online resource data and/or any suitable credential management data (e.g., information suitable to enable or otherwise facilitate the provisioning or other suitable management of one or more credentials on the secure element of NFC component 120) between device 100 and server 310 via any suitable communications protocol supported by communications component 106 of device 100 (e.g., Wi-Fi, Bluetooth™, cellular, wired network protocols, etc.). Such online-based communication may be provided within any suitable online-context, such as when a user of device 100 is communicating with server 310 to conduct any suitable business through user interaction with a third party application 113 (e.g., a native app or a hybrid app) running on device 100 that may be managed by server 310 and/or through user interaction with an internet application 113 or web browser (e.g., Safari™ by Apple Inc.) running on device 100 that may be pointed to a uniform resource locator ("URL") whose target or web resource (e.g., web app or web page) may be managed by server 310. Accordingly, it is noted that such online-based communication between server 310 and electronic device 100 may occur wirelessly and/or via wired paths (e.g., over the internet). Server 310 may be provided by a bank (e.g., a bank of issuing bank subsystem 370) and/or by a network (e.g., a network of payment network subsystem 360) of financial institution subsystem 350 (e.g., as a webserver to host website data and/or to manage third party application data for a bank application 113). Although not shown, server 310 (e.g., of financial institution subsystem 350) may also include or be associated with or work in conjunction with a processor component that may be the same as or similar to a processor component 102 of electronic device 100, a communications component that may be the same as or similar to a communications component 106 of electronic device 100, an I/O interface that may be the same as or similar to an I/O interface of electronic device 100, a bus that may be the same as or similar to a bus of electronic device 100, a memory component that may be the same as or similar to a memory component of electronic device 100, and/or a power supply component that may be the same as or similar to a power supply component of electronic device 100.

Although server 310 may be referred to herein as a "bank" server, it is understood that server 310 may be associated with any suitable entity or institution that may manage or at least partially control an online resource (e.g., a third party application or website) that may facilitate the management of credentials on an electronic device when that online resource is accessed by a user of the electronic device. Additionally or alternatively, although online resource or application 113 may be referred to herein as a "bank" application or "bank app," it is understood that such an online resource may be any suitable third party application or website that may be managed or at least partially controlled by any suitable entity or institution that may facilitate the management of credentials on an electronic device when that online resource is accessed by a user of the electronic device. Moreover, application 113 may be used herein to refer to any suitable online resource that may be managed or at least partially controlled by server 310 and may include any suitable application (e.g., a native app or a hybrid app) running on device 100 that may be managed by server 310 and/or any suitable web browser running on device 100 that may be pointed to a URL or any other suitable address whose target or web resource (e.g., web app or web page) may be managed by server 310.

Moreover, in addition to at least one credential SSD and/or ISD 152 being provisioned on a secure element of electronic device 100, at least one third party application (e.g., application 113) may be accessed by device 100 in order to enable a user to access an online resource (e.g., for enabling online-based communication between device 100 and server 310). First, such an application 113 may be approved or otherwise enabled by commercial entity subsystem 400 before application 113 may be accessible by device 100. For example, an application store 420 of commercial entity subsystem 400 (e.g., the Apple App Store™) may receive at least some date representative of application 113 from server 310 (e.g., via communications path 55). Moreover, in some embodiments, commercial entity subsystem 400 and/or server 310 may generate or otherwise assign one or more application identifiers ("App IDs") to any application 113 managed by server 310 that may be utilized by electronic device 100 for online communication with server 310. Additionally or alternatively, commercial entity subsystem 400 and/or server 310 may generate or otherwise assign one or more application identifiers ("App IDs") to any website (e.g., one or more URLs) managed by server 310 that may be accessed by electronic device 100 for online communication with server 310. Additionally or alternatively, commercial entity subsystem 400 and/or server 310 may generate or otherwise assign one or more appropriate application identifiers ("App IDs") to any commerce credential provisioned on the secure element of electronic device 100. In some embodiments, such an App ID may be specifically associated with a specific application 113 and/or website, while, in other embodiments, an App ID may be specifically associated with a managing entity of server 310 such that a specific App ID may be associated with multiple third party applications or websites that may be operated by the same server 310. By assigning at least one App ID to at least one credential provisioned on device 100 and by assigning at least one App ID to at least one third party application or website managed by server 310, a layer of security may be provided for enabling management of one or more credentials on device 100 using an online resource of server 310.

Description of FIG. 2

Referring now to FIG. 2, FIG. 2 shows a more detailed view of electronic device 100 of system 1 described above with respect to FIGS. 1 and 1A. As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2. One or more input components 110 may be provided to permit a user to interact or interface with device 100 and/or one or more output components 112 may be provided to present information (e.g., graphical, audible, and/or tactile information) to a user of device 100. It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen. Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 1A, processor 102 may be used to run one or more applications, such as an application 103 and/or an application 113. As one example, application 103 may be an operating system application while application 113 may be a third party application (e.g., an application associated with a bank of financial institution subsystem 350).

NFC component 120 may be any suitable proximity-based communication mechanism that may enable any suitable contactless proximity-based transactions or communications 15 between electronic device 100 and merchant subsystem 200 (e.g., a merchant payment terminal 220 of merchant subsystem 200). NFC component 120 may include any suitable modules for enabling contactless proximity-based communication 15 between electronic device 100 and subsystem 200. As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to terminal 220 as part of a contactless proximity-based or NFC communication 15. Additionally or alternatively, NFC data module 132 may be configured to contain, route, or otherwise receive any suitable data that may be received by NFC component 120 from terminal 220 as part of a contactless proximity-based communication 15. NFC controller module 140 may include at least one NFC processor module 142. NFC processor module 142 may operate in conjunction with NFC device module 130 to enable, activate, allow, and/or otherwise control NFC component 120 for communicating NFC communication 15 between electronic device 100 and terminal 220. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communication 15 between electronic device 100 and merchant subsystem 200. NFC memory module 150 may be tamper resistant and may provide at least a portion of a secure element 145 (see, e.g., FIG. 3). For example, such a secure element 145 may be configured to provide a tamper-resistant platform (e.g., as a single or multiple chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of financial institution subsystem and/or an industry standard, such as GlobalPlatform).

As shown in FIG. 2, for example, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., financial institution subsystem 350) may store keys and/or other suitable information for creating or otherwise provisioning one or more credentials (e.g., credentials associated with various credit cards, bank cards, gift cards, access cards, transit passes, etc.) on electronic device 100 (e.g., via communications component 106), for credential content management, and/or security domain management. A specific supplemental security domain ("SSD") 154 (e.g., one of SSDs 154a and 154b) may be associated with a particular TSM and at least one specific commerce credential (e.g., a specific credit card credential or a specific public transit card credential) that may provide specific privileges or payment rights to electronic device 100. Each SSD 154 may have its own manager key and may include or be associated with at least one of its own credential applications or credential applets (e.g., a Java card applet instances) that may be associated with a particular commerce credential (e.g., a respective one of credential applets 153a and 153b), where a credential applet may have its own access key (e.g., access key 155a for credential applet 153a, and access key 155b for credential applet 153b) and where a credential applet may need to be activated to enable its associated commerce credential for use by NFC device module 130 as an NFC communication 15 between electronic device 100 and merchant subsystem 200. For example, an applet 153 of an SSD 154 may be an application that may run on a secure element 145 of NFC component 120 (e.g., in a GlobalPlatform environment).

A key 155 of an SSD 154 may be a piece of information that can determine a functional output of a cryptographic algorithm or cipher. For example, in encryption, a key may specify a particular transformation of plaintext into ciphertext, or vice versa during decryption. Keys may also be used in other cryptographic algorithms, such as digital signature schemes and message authentication codes. Each key and applet may be loaded on the secure element of device 100 by a TSM or an authorized agent or pre-loaded on the secure element when first provided on device 100. While credential SSD 154*a* may be associated with a particular credit card credential, that particular credential may only be communicated as a commerce credential data communication to merchant subsystem 200 (e.g., as a contactless proximity-based communication 15 to merchant terminal 220) from a secure element of device 100 (e.g., from NFC component 120) for a financial transaction when applet 153*a* of that credential SSD 154*a* has been enabled or otherwise activated or unlocked for such use.

Security features may be provided for enabling use of NFC component 120 that may be particularly useful when transmitting confidential payment information, such as credit card information or bank account information of a credential, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area. In certain embodiments, some or all of the security features may be stored within NFC memory module 150. Further, security information, such as an authentication key, for communicating commerce credential data with merchant subsystem 200 may be stored within NFC memory module 150. In certain embodiments, NFC memory module 150 may include a microcontroller embedded within electronic device 100. As just one example, a component or any suitable portion of the secure element may be configured to determine intent and local authentication of a user of device 100 (e.g., via one or more input components 110, such as a biometric input component) and, in response to such a determination, may be configured to enable a particular SSD for conducting a payment transaction (e.g., with a credential of credential SSD 154*a*).

Description of FIG. 3

Referring now to FIG. 3, FIG. 3 shows another detailed view of a portion of electronic device 100 of system 1 described above with respect to FIGS. 1-2. As shown in FIG. 3, for example, a secure element 145 of NFC component 120 may include a first SSD 154*a*, which may include or be associated with applet 153*a*, which may include an access key 155*a* and/or a credential key 155*a*', a second SSD 154*b*, which may include or be associated with applet 153*b*, which may include an access key 155*b* and/or a credential key 155*b*', and a third SSD 154*c*, which may include or be associated with applet 153*c*, which may include an access key 155*c* and/or a credential key 155*c*', where each one of access keys 155*a*-155*c* may also be known to a commercial entity subsystem (e.g., commercial entity subsystem 400, as shown in FIG. 1A), and/or where each one of credential keys 155*a*'-155*c*' may also be known to a financial institution subsystem (e.g., financial institution subsystem 350, as shown in FIG. 1A). Each SSD 154 may have its own manager key 155 (e.g., a respective one of keys 155*ak*, 155*bk*, and 155*ck*) that may need to be activated to enable a function of that SSD 154 for use by NFC device module 130. Additionally or alternatively, each SSD 154 may include and/or be associated with at least one of its own credential applications or credential applets (e.g., a Java card applet instances) associated with a particular commerce credential (e.g., credential applet 153*a* of SSD 154*a* may be associated with a first commerce credential, credential applet 153*b* of SSD 154*b* may be associated with a second commerce credential, and/or credential applet 153*c* of SSD 154*c* may be associated with a second commerce credential), where a credential applet may need to be activated to enable its associated commerce credential for use by NFC device module 130 as an NFC communication 15 between electronic device 100 and merchant subsystem 200. In some embodiments, a credential key of a credential applet (e.g., credential key 155*a*' for credential applet 153*a*, credential key 155*b*' for credential applet 153*b*, and/or credential key 155*c*' for credential applet 153*c*) may be generated by financial institution subsystem 350 that may be responsible for such a credential and may be accessible by that financial institution subsystem 350 (e.g., as shown in FIG. 1A) for enabling secure transmission of that credential applet between secure element 145 and financial institution subsystem 350. Additionally or alternatively, an access key of a credential applet (e.g., access key 155*a* for credential applet 153*a*, access key 155*b* for credential applet 153*b*, and/or access key 155*c* for credential applet 153*c*) may be generated by commercial entity subsystem 400 and may be accessible by commercial entity subsystem 400 (e.g., as shown in FIG. 1A) for enabling secure transmission of that credential applet between secure element 145 and commercial entity subsystem 400.

Additionally or alternatively, as shown in FIG. 3, secure element 145 may include ISD 152, which may include an ISD key 156*k* that may also be known to a trusted service manager associated with that security domain (e.g., commercial entity subsystem 400, as shown in FIG. 1A). ISD key 156*k* may be leveraged by commercial entity subsystem 400 and electronic device 100 similarly to and/or instead of an access key (e.g., access key 155*a*) for enabling secure transmissions between commercial entity subsystem 400 and secure element 145 of electronic device 100. Moreover, as shown in FIG. 3, each SSD 154 and bank application 113 may each be associated with at least one App ID. For example, SSD 154*a* and/or its associated credential applet 153*a* may include and/or be associated with an App ID information 159*a* that may associate SSD 154*a* and/or its associated credential applet 153*a* with at least one particular App ID, SSD 154*b* and/or its associated credential applet 153*b* may include and/or be associated with an App ID information 159*b* that may associate SSD 154*b* and/or its associated credential applet 153*b* with at least one particular App ID, SSD 154*c* and/or its associated credential applet 153*c* may include and/or be associated with an App ID information 159*c* that may associate SSD 154*c* and/or its associated credential applet 153*c* with at least one particular App ID, and/or bank application 113 may include and/or be associated with App ID information 159*d* that may associate bank application 113 with at least one particular App ID. Each App ID information 159 (e.g., 159*a*-159*d*) may be any suitable type of information that may be associated with a credential or application in any suitable way. Moreover, as shown in FIG. 3, and as described below in more detail, various data may be communicated between processor 102 and secure element 145. For example, processor 102 of device 100 may be configured to run a device application 103 that may communicate information with a bank application 113 of processor 102 as well as secure element 145, an I/O component 114*a* (e.g., for receiving I/O input data 115*i* and/or for transmitting I/O output data 115*o*), and/or communications component 106.

Additionally or alternatively, as shown in FIG. 3, secure element 145 may include a controlling authority security domain ("CASD") 158, which may be a special purpose security domain that may be configured to serve as a third-party on-element root of trust. An associated application of CASD 158 may be configured to provide on-element confidential key generation as a global service to other applications and/or to a specific management layer (e.g., a GlobalPlatform management layer). Confidential key material that may be used within CASD 158 may be configured such that it cannot be inspected or modified by any entity, including an issuer of secure element 145. CASD 158 may be configured to include and/or may be configured to generate and/or otherwise include CASD access kit 158k (e.g., a CASD private key ("CASD-SK"), a CASD public key ("CASD-PK"), a CASD certificate ("CASD-Cert."), and/or a CASD-signing module). For example, CASD 158 may be configured to sign and/or encrypt certain data on secure element 145 (e.g., using CASD access kit 158k) before providing such data to another portion of device 100 (e.g., communications component 106 for sharing with other subsystems of system 1). As an example, CASD 158 may be configured to sign any data that is provided by secure element 145 such that other subsystems (e.g., commercial entity subsystem 400) may be able to confirm that such signed data was signed by secure element 145 (e.g., using an associated CASD kit 158k at commercial entity subsystem 400).

Additionally or alternatively, as shown in FIG. 3, secure element 145 may include a contactless registry services ("CRS") applet or application 151 that may be configured to provide local functionality to electronic device 100 for identifying and/or modifying the App ID, life cycle state, and/or activation state (e.g., activated, deactivated, locked, enabled, disabled, etc.) of certain security domain elements and sharing certain output information related to that information with another portion of device 100 (e.g., a device application 103 of device 100 off of the secure element). For example, a CRS application may include a CRS list that may maintain a list of the current state of each security domain element on secure element 145 (e.g., state of applet 153a of SSD 154a, of applet 153b of SSD 154b, and/or of applet 153c of SSD 154c), where the CRS application may be configured to share the state of one or more security domain elements of secure element 145 with an application of device 100 (e.g., with device application 103 that may be running as a background process inside an operating system application but that may not be under the control of an interactive user of device 100), which in turn may provide certain state information to a user of device 100 as output information 115o via I/O interface 114a and/or to a user interface ("UI") application or other suitable application that may be running on device 100 (e.g., bank application 113, as described below), which may enable a user to enact a change in state of a security domain element (e.g., to update such a CRS list and a state of a security domain element, such as for enabling a commerce credential of a specific credential applet for use in an NFC communication 15). Additionally or alternatively, CRS 151 may include a CRS access kit 151k that may also be known to a trusted service manager associated with CRS 151 (e.g., commercial entity subsystem 400, as shown in FIG. 1A). CRS access kit 151k may be leveraged by commercial entity subsystem 400 and electronic device 100 similarly to and/or instead of an access key (e.g., access key 155a) for enabling secure transmissions between commercial entity subsystem 400 and secure element 145 of electronic device 100.

Credential payment passes on a secure element may have associated server-managed states on the secure element and may not be immediately usable. For example, a credential applet may include a read-only property, such as an activation state. Various activation states may be associated with various credential payment passes including, but not limited to, an "active" state when a credential may be active and ready for use in a payment transaction, a "requires activation" state when a credential may not be active but may be activated with an activation code that may be provided by an issuer, an "activation in progress" state when a credential may not be ready for use but activation is in progress and no further information is currently required, an "activation terminated" state when activation with a code or a cryptographic one-time password ("OTP") was required but has been terminated (e.g., if an activation code has expired), a "not provisioned" state when the secure element has not been provisioned with a credential for a particular pass, a "suspended" state when a credential is not active and cannot be activated with an activation code, a "disabled by issuer" state when an issuer has disabled an account associated a credential and the account may not be reactivated without reprovisioning the credential, and the like. In some embodiments, credentials with such an active state may be referred to herein as "enabled," while credentials with such a requires activation state, activation in progress state, or activation terminated state may be referred to herein as "disabled," and while credentials with such a not provisioned state, suspended state, or disabled by issuer state may be referred to herein as "missing".

Additionally or alternatively, a CRS application may include a CRS list that may maintain a list of the current App ID or App IDs that may be associated with each security domain element on secure element 145 (e.g., based on App ID information 159a of SSD 154a, App ID information 159b of SSD 154b, and/or App ID information 159c of SSD 154c), where the CRS application may be configured to share the App ID(s) of one or more security domain elements of secure element 145 with an application of device 100 (e.g., with device application 103), which in turn may provide certain App ID information and/or other information associated with SSDs associated with a particular App ID to a user of device 100 as output information 115o via I/O interface 114a and/or via a user interface ("UI") application or other suitable application that may be running on device 100 (e.g., bank application 113, as described below). For example, device application 103 may be configured to receive such a list of the life cycle state and the App ID(s) associated with each SSD of secure element 145 and may share the life cycle state and/or any other suitable information for any SSDs that share at least one App ID with an App ID associated with an online resource (e.g., bank application 113) that may be running on device 100. Therefore, in response to device 100 identifying at least one SSD 154 of secure element 145 that may be associated with an App ID that may also be associated with an online resource running on device 100 (e.g., by comparing App ID information 159d with App ID information 159a-159c), device 100 may be configured to share the life cycle state information and/or any other suitable identifying information for each identified SSD 154 with that online resource (e.g., bank application 113), such as for enabling management of each identified SSD 154 using that online resource, as described below in more detail.

Description of FIG. 4

As shown in FIG. 4, and as described below in more detail, a specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. For example, a touch screen I/O component 114a may include a display output component 112a and an associated touch input component 110f, where display output component 112a may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 4, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Bank App" textual indicator 181 (i.e., specific icon 183) is selected, device 100 may launch or otherwise access a specific third party bank application and may display screens of a specific user interface that may include one or more tools or features for interacting with device 100 in a specific manner (see, e.g., FIGS. 10A-10D for specific examples of such displays of GUI 180 during use of a bank application (e.g., application 113) that may be used by a user of device 100 for provisioning or otherwise managing credentials of secure element 145 (e.g., a credential of SSD 154b)). For each application, screens may be displayed on display output component 112a and may include various user interface elements. Additionally or alternatively, for each application, various other types of non-visual information may be provided to a user via various other output components 112 of device 100.

Description of FIG. 5, FIG. 6, and FIGS. 10A-10D

Figure 5:
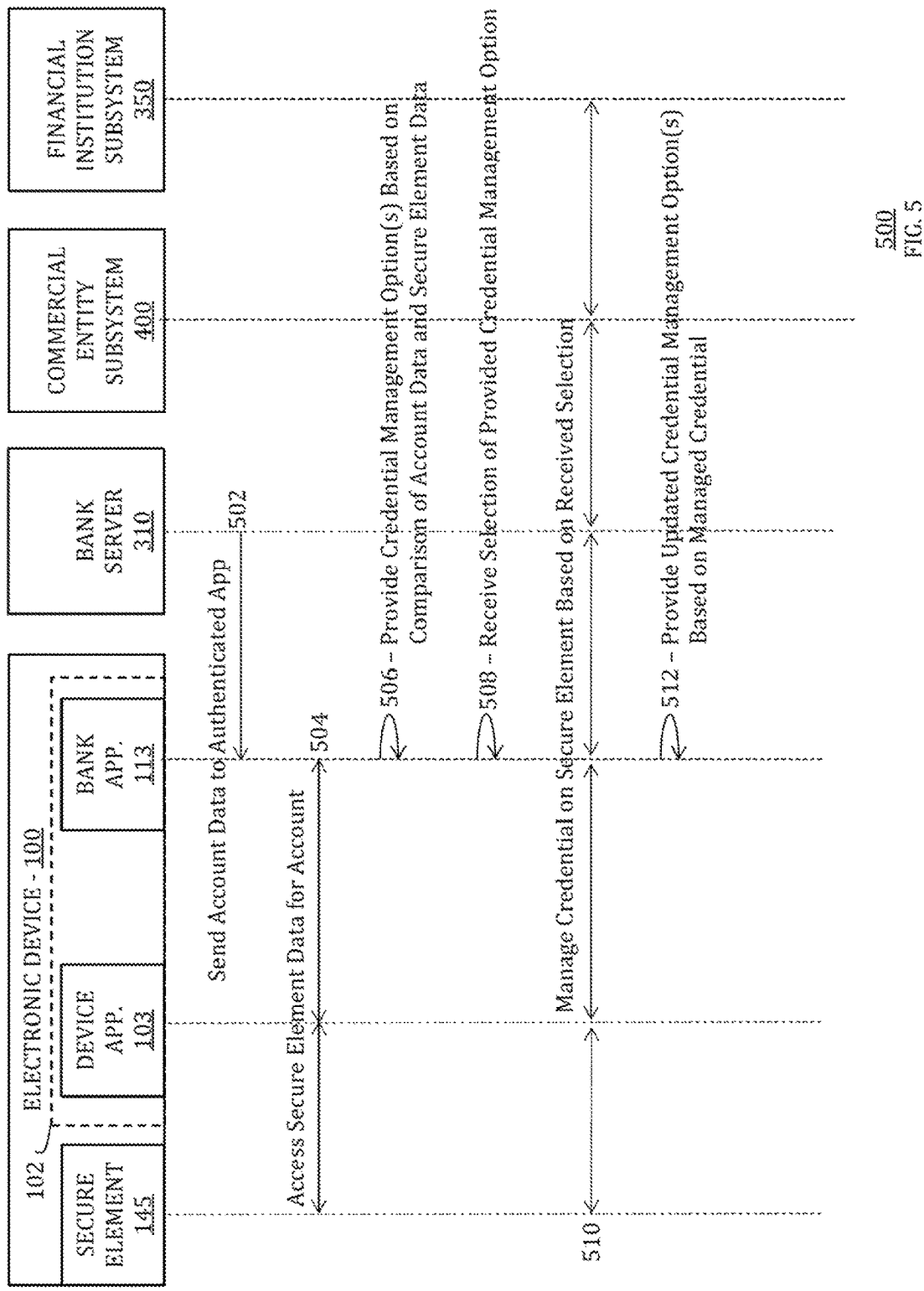
Figure 6:
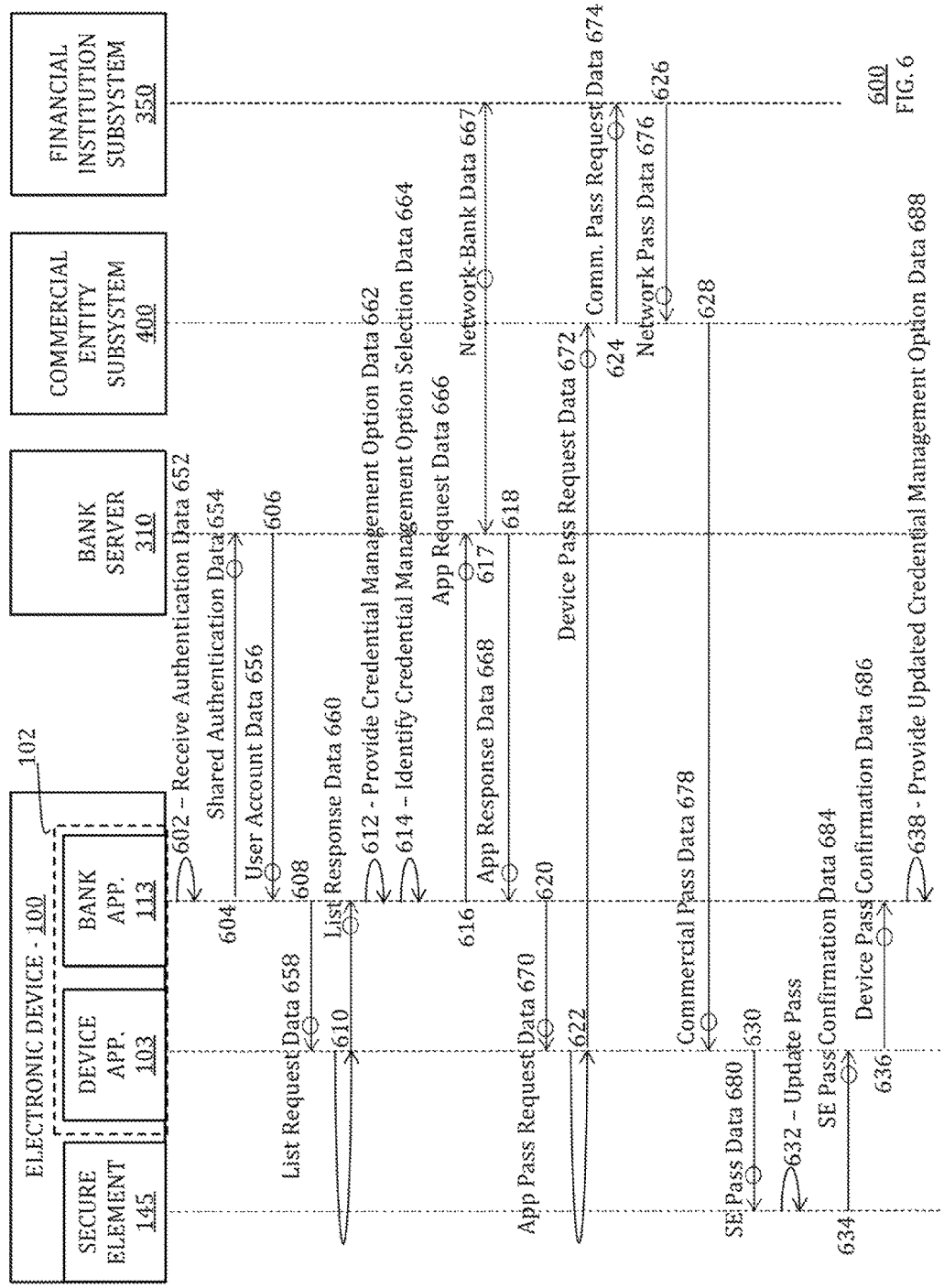

To facilitate the following discussion regarding the operation of system 1 for securely provisioning or otherwise managing credentials on an electronic device using an online resource, reference is made to one or more processes of one or more flowcharts of FIGS. 5 and 6, to various components of system 1 of the schematic diagrams of FIGS. 1-4, and to front views of screens 190-190d that may be representative of a graphical user interface of electronic device 100 during such credential management (e.g., as shown in FIGS. 4 and 10A-10D). The operation described may be achieved with a wide variety of graphical elements and visual schemes. Therefore, the embodiments of FIGS. 4 and 10A-10D are not intended to be limited to the precise user interface conventions adopted herein. Rather, embodiments may include a wide variety of user interface styles.

FIG. 5 is a flowchart of an illustrative process 500 for securely managing credentials on an electronic device using an online resource. Process 500 is shown being implemented by electronic device 100 (e.g., secure element 145, device app 103, and bank app 113), bank server 310, commercial entity subsystem 400, and financial institution subsystem 350. However, it is to be understood that process 500 may be implemented using any other suitable components or subsystems. Process 500 may provide a seamless user experience for securely managing credentials on secure element 145 of electronic device 100 using an online resource (e.g., bank application 113). Process 500 may begin at step 502, where user account data for a particular user may be transmitted to an online resource at an electronic device from a remote server. For example, server 310 may transmit user account data to device 100 for use by bank application 113. In some embodiments, such a transmission of account data may only be conducted in response to a user appropriately authenticating itself with bank application 113 on device 100. For example, a user may interface with bank application 113 running on device 100 (e.g., via I/O interface 114a) for authenticating itself with respect to an account managed by or otherwise under the control of server 310. In some embodiments, server 310 and, thus, application 113 may be managed and/or otherwise at least partially under the control of a bank of issuing bank network 370 (e.g., application 113 may be a banking application for Bank of America, with which a user of device 100 may have an account that may be associated with one or more payment credentials (e.g., credit cards, debit cards, etc.)). Through user interaction with such a Bank of America online resource bank application 113 on device 100, a user may authenticate itself in order to view certain account data of that user's account with Bank of America via application 113. Application 113 and server 310 may be configured in any suitable way to appropriately authenticate a user of device 100 with an account, such as through user PIN-entry, user biometric data entry, username/password entry, user-question answering entry, and the like. In response to application 113 receiving user authentication information at device 100 and in response to such authentication information being communicated from device 100 to server 310 (e.g., via communications path 75 of FIG. 1A), server 310 may analyze that authentication information and return appropriate user account data to device 100 at step 502 of process 500 if that authentication information is determined to be appropriate by server 310.

At step 504, an electronic device may utilize any data associated with an online resource used at step 502 and/or associated with any account data received at step 502 in order to access any appropriate secure element data. For example, electronic device 100 may identify at least one, some, or all App IDs that may be associated with an online resource currently being used by device 100 (e.g., App ID 159d of bank application 113) and then may attempt to access secure element data indicative of at least one, some, or all credentials on secure element 145 that may be associated with one or more of the identified App IDs of the online resource. In some embodiments, device 100 may be configured to determine that App ID 159d is associated with currently running application 113 based on any suitable account data that may be received by device 100 at step 502 (e.g., in response to a user of device 100 authenticating itself with server 310 via application 113). Alternatively or additionally, device 100 may be configured to determine that App ID 159d is associated with currently running application 113 based on any suitable information that may be locally stored on device 100 with respect to application 113 and/or that may be inherently associated with application 113 regardless of whether or not application 113 has received account data at step 502 in response to user authentication. In response to identifying that App ID 159d is associated with currently running application 113, device 100 (e.g., device application 103) may be configured to communicate with secure element 145 or enact any other suitable procedure in order to access any suitable data with respect to any SSD 154 of secure element 145 that may be associated with App ID 159*d*. Bank application 113 may be configured to access such secure element data by communicating with device application 103 (e.g., an operating system application and/or a software developer kit ("SDK")) that may be available to processor 102 of device 100 and that may be configured to communicate with the bank online resource 113 via any suitable techniques (e.g., via one or more application programming interfaces ("APIs")). Device application 103 may be configured to access various types of information available to device 100 (e.g., from memory 104 and/or secure element 145). For example, device application 103 may be configured to access suitable information for every SSD 154 of secure element 145 (e.g., credential description information (e.g., partial PAN information), App ID information, activation state information, and the like (e.g., from a CRS list of secure element 145)), and device application 103 may then be configured to filter such information so that only such information for each SSD 154 that is associated with an App ID that is also associated with bank application 113 may be provided by device application 103 to bank application 113. Alternatively, device application 103 may be configured to access suitable information only for each SSD 154 of secure element 145 (e.g., from a CRS list of secure element 145) that may be associated with an App ID that is also associated with bank application 113, and device application 103 may be configured to provide only that accessed information to bank application 113.

Next, at step 506, process 500 may include an electronic device comparing any suitable secure element data accessed at step 504 with any suitable account data received at step 502 in order to provide at least one credential management option on the electronic device (e.g., to a user of the device). For example, the account data received at step 502 may be indicative of one or more or credentials associated with a user account (e.g., an account with which a user of device 100 has been authenticated via application 113), and the secure element data received at step 504 may be indicative of one or more credentials at least partially provisioned on secure element 145 that may be associated with application 113 (e.g., one or more credentials that may share an App ID with application 113). At step 506, device 100 may compare each credential of the account data with any credentials of the secure element data in order to provide one or more credential management options based on the comparison. For example, as shown by screens 190*a*-190*d* of FIGS. 10A-10D, device 100 (e.g., application 113 via I/O interface 114*a*) may provide a user with one or more options for managing credentials on secure element 145.

Starting with a first exemplary situation where secure element 145 may include first SSD 154*a* with a fully provisioned and enabled first SE credential of first applet 153*a* that may be associated with an App ID 159*a* equal to App ID 159*d* of application 113, as well as second SSD 154*b* with a partially provisioned but not yet enabled second SE credential of second applet 153*b* that may be associated with an App ID 159*b* equal to App ID 159*d* of application 113, but no third SSD 154*c*, then application 113 may be provided with secure element data at step 504 that may be indicative of the enabled first SE credential of SSD 154*a* and the disabled second SE credential of SSD 154*b* but not indicative of any third SE credential of SSD 154*c* (e.g., SSD 154*c* may not yet exist on secure element 145). For example, such secure element data may be indicative of an enabled first SE credential of SSD 154*a* that may be signed with an App ID matching the App ID of bank application 113 and that may have an active activation state. Additionally or alternatively, such secure element data may be indicative of a disabled second SE credential of SSD 154*b* that may be signed with an App ID matching the App ID of bank application 113 and that may have a requires activation state, an activation in progress state, or an activation terminated state. Additionally or alternatively, such secure element data may be indicative of a missing third SE credential of SSD 154*c* that may be signed with an App ID matching the App ID of bank application 113 and that may have a not provisioned state, a suspended state, or a disabled by issuer state. Additionally or alternatively, such secure element data may not be indicative of any third SE credential of any SSD 154*c* at all as that SSD may not yet exist on secure element 145.

Continuing with such a first exemplary situation, the account data received by application 113 at step 502 may be indicative of three credentials associated with a user's account, such as a first account credential A, a second account credential B, and a third account credential C. Through comparing such secure element data of step 504 with such account data of step 502 of this first exemplary situation (e.g., at step 506), application 113 may be configured to determine that first account credential A is the same as the enabled first SE credential of SSD 154*a*, that second account credential B is the same as the partially provisioned or disabled second SE credential of SSD 154*b*, and that third account credential C is the same as the missing third SE credential of SSD 154*c* or that third account credential C is not currently available in the form of an SE credential on secure element 145, and, in response to such comparing, application 113 may be configured to provide one or more credential management options (e.g., to a user of device 100). For example, as shown by screen 190*a* of FIG. 10A, device 100 may be configured to provide at least one credential management option for at least one of the account credentials identified by the account data of step 502 based on the secure element data of step 504 for this first exemplary situation. Specifically, screen 190*a* may include a listing of all three account credentials A, B, and C, as well as a listing of the status of each credential on secure element 145 of device 100, as well as a listing of at least one management option for each account credential (e.g., "delete" management option 1001*a* for facilitating the deletion of account credential A as the enabled first SE credential of SSD 154*a* from secure element 145, "enable" management option 1001*b* for facilitating the enablement of account credential B as the disabled second SE credential of SSD 154*b* on secure element 145, and/or "add" or "install" management option 1001*c* for facilitating the addition of account credential C as a new third SE credential (e.g., of a new third SSD 154*c*) on secure element 145).

At step 508, after at least one credential management option is provided at step 506, process 500 may receive a selection of a provided credential management option and, then, at step 510, may carry out that selected option by managing a credential on secure element 145 in a particular way, after which process 500 may provide at least one updated credential management option at step 512. For example, continuing with the first exemplary situation, one of options 1001*a*-1001*c* provided by screen 190*a* at step 506 may be selected at step 508. In response to providing UI screen 190*a* of FIG. 10A at step 506 (e.g., based on a comparison of account data and secure element data as I/O output data 115*o* of FIG. 3), a user may interact with device 100 (e.g., with I/O interface 114*a*) in one of many possible ways (e.g., with a user input selection of one of options 1001*a*-1001*c* as I/O input data 115*i* of FIG. 3) for managing a credential on secure element 145. For example, a user may choose option 1001*a* of FIG. 10A at step 508, device 100 may then communicate with bank server 310, commercial entity subsystem 400, and/or financial entity subsystem 350 in one or more various ways to delete account credential A as the enabled first SE credential of SSD 154a from secure element 145 at step 510 based on the selection of option 1001a, and then device 100 may be configured to provide an updated credential management option based on the managed credential of step 510 at step 512, for example, by providing screen 190b of FIG. 10B that may include a listing of all three account credentials A, B, and C, as well as a listing of the updated status of at least one credential on secure element 145 of device 100, as well as a listing of at least one updated management option for at least one account credential (e.g., updated management option 1003a for facilitating the addition of account credential A as a new SE credential (e.g., of SSD 154a) on secure element 145 following the recent deletion of that credential from secure element 145, management option 1003b for facilitating the enablement of account credential B as the disabled second SE credential of SSD 154b on secure element 145, and/or management option 1003c for facilitating the addition of account credential C as a new third SE credential (e.g., of a new third SSD 154c) on secure element 145). As another example, a user may choose option 1001b of FIG. 10A at step 508, device 100 may then communicate with bank server 310, commercial entity subsystem 400, and/or financial entity subsystem 350 in one or more various ways to enable account credential B as the disabled second SE credential of SSD 154b on secure element 145 at step 510 based on the selection of option 1001b, and then device 100 may be configured to provide an updated credential management option based on the managed credential of step 510 at step 512, for example, by providing screen 190c of FIG. 10C that may include a listing of all three account credentials A, B, and C, as well as a listing of the updated status of at least one credential on secure element 145 of device 100, as well as a listing of at least one updated management option for at least one account credential (e.g., management option 1005a for facilitating the deletion of account credential A as the enabled first SE credential of SSD 154a from secure element 145, updated management option 1005b for facilitating the deletion of account credential B as the recently enabled second SE credential of SSD 154b on secure element 145, and/or management option 1005c for facilitating the addition of account credential C as a new third SE credential (e.g., of a new third SSD 154c) on secure element 145). As yet another example, a user may choose option 1001c of FIG. 10A at step 508, device 100 may then communicate with bank server 310, commercial entity subsystem 400, and/or financial entity subsystem 350 in one or more various ways to add account credential C as a new enabled third SE credential of SSD 154c on secure element 145 at step 510 based on the selection of option 1001c, and then device 100 may be configured to provide an updated credential management option based on the managed credential of step 510 at step 512, for example, by providing screen 190d of FIG. 10D that may include a listing of all three account credentials A, B, and C, as well as a listing of the updated status of at least one credential on secure element 145 of device 100, as well as a listing of at least one updated management option for at least one account credential (e.g., management option 1007a for facilitating the deletion of account credential A as the enabled first SE credential of SSD 154a from secure element 145, management option 1007b for facilitating the enablement of account credential B as the disabled second SE credential of SSD 154b on secure element 145, and/or updated management option 1007c for facilitating the deletion of account credential C as recently added and enabled third SE credential of SSD 154c from secure element 145).

After a user of device 100 may select a provided credential management option at step 508 (e.g., by selecting one of credential management options 1001a-1001c of screen 190a of FIG. 10A), the remaining steps of process 500 may occur transparent to the user. That is, once the user provides a selection of a provided credential management option at step 508, steps 510 and 512 may occur without any further user interaction and may seem instantaneous to a user, whereby process 500 may appear to a user as if, after step 508, the status of credential data on secure element 145 has been automatically and/or instantaneously updated (e.g., as if credential data has been automatically and/or instantaneously deleted from secure element 145, enabled on secure element 145, and/or added to secure element 145) and that updated status may be provided to the user along with any new credential management options based on that updating (e.g., by providing one of updated screens 190b-190d of FIGS. 10B-10D). Therefore, process 500 may provide a more seamless user experience when a user is interfacing with or otherwise using an online resource 113 on device 100, where that online resource 113 may be associated with one or more credentials that have already been at least partially provisioned on device 100 and/or that may be able to be at least partially provisioned on device 100. Such management of one or more credentials on a secure element 145 of electronic device 100 through user interaction with an online resource 113 may increase the functionality of the online resource and/or enhance a user's experience with device 100 and its credential management abilities.

It is understood that the steps shown in process 500 of FIG. 5 are merely illustrative and that existing steps may be modified or omitted, additional steps may be added, and the order of certain steps may be altered.

FIG. 6 is a flowchart of an illustrative process 600 for securely managing credentials on an electronic device using an online resource. Process 600 is shown being implemented by electronic device 100 (e.g., secure element 145, device app 103, and bank app 113), bank server 310, commercial entity subsystem 400, and financial institution subsystem 350. However, it is to be understood that process 600 may be implemented using any other suitable components or subsystems. Process 600 may provide a seamless user experience for securely managing credentials on secure element 145 of electronic device 100 using an online resource (e.g., bank application 113). Process 600 may begin at step 602, where online resource 113, which may be running on device 100, may receive any suitable authentication data 652. For example, authentication data 652 may be any suitable data that may be provided to online resource 113 for attempting to authenticate a user with an account of a service that may be provided by online resource 113. In some embodiments, a user of device 100 may interface with bank application 113 (e.g., by providing I/O input data 115i (e.g., in response to authentication request data that may be provided as I/O output data 115o by application 113)) for authenticating itself with respect to an account managed by or otherwise under the control of server 310 of application 113. In some embodiments, server 310 and, thus, application 113 may be managed and/or otherwise at least partially under the control of a bank of issuing bank network 370 (e.g., application 113 may be a banking application for Bank of America, with which a user of device 100 may have an account that may be associated with one or more payment credentials (e.g., credit cards, debit cards, etc.)). Through user interaction with such a Bank of America online resource bank application 113 on device 100, a user may provide authentication data 652 to application 113 in an attempt to authenticate the user in order to view certain account data of that user's account with Bank of America from server 310 via application 113 on device 100. Application 113 and server 310 may be configured in any suitable way to appropriately receive authentication data 652 from a user of device 100, such as through user PIN-entry, user biometric data entry, username/password entry, user-question answering entry, and the like.

Next, at step 604, shared authentication data 654 may be transmitted from device 100 to server 310. For example, in response to receiving authentication data 652 at step 602, application 113 may be configured to transmit (e.g., automatically or by user request) at least a portion of authentication data 652 or any other suitable data based on authentication data 652 to server 310 as shared authentication data 654. In some embodiments, application 113 running on device 100 may be configured to authenticate a user in response to receiving authentication data 652 and without receiving any additional new information from server 310, and then application 113 may be configured to transmit shared authentication data 654 in response to such authentication. Alternatively, in some embodiments, application 113 may be configured to require processing of authentication data 652 by server 310 and/or additional data from server 310 based on authentication data 652 in order to authenticate the user. Therefore, in such embodiments, shared authentication data 654 may include a request from application 113 for server 310 to authenticate the user based on authentication data 652. Such shared authentication data 654 may be transmitted by electronic device 100 to server 310 at step 604 via communications path 75 of FIG. 1. For example, communications component 106 of electronic device 100 may be configured to transmit data 654 using any suitable communications protocol over any suitable communications path 75. Bank server 310 and bank application 113 may be configured to use any suitable data encryption schemes (e.g., via shared keys) for preventing any data communicated therebetween from being intercepted and utilized maliciously.

In response to receiving shared authentication data 654, server 310 may be configured to process shared authentication data 654 and transmit user account data 656 to device 100 at step 606. User account data 656 may include any suitable data that may be indicative of a user's account with server 310. For example, server 310 may process shared authentication data 654 from device 100 in order to determine whether a user has authenticated himself with respect to a user account with server 310 and, if so, may generate and transmit user account data 656 that may include any suitable information with respect to that user account from server 310 to device 100 at step 606. In some embodiments, such user account data 656 may include information indicative of at least one account credential that may be associated with that authenticated user account (e.g., the last 4-digits of a primary account number for a credential and/or any other suitable metadata that may describe each account credential). For example, as shown in screens 190a-190d of FIGS. 10A-10D, such user account data 656 may include information "A" that may be provided to a user for describing a first account credential, information "B" that may be provided to a user for describing a second account credential, and/or information "C" that may be provided to a user for describing a third account credential when such account credential information may be provided in conjunction with one or more credential management options by device 100 (e.g., at step 612 described below). Such information may include at least a hashed or incomplete version of an F-PAN for each account credential and/or any associated D-PANs. Such user account data 656 may be transmitted by server 310 to electronic device 100 at step 606 via communications path 75 of FIG. 1. For example, communications component 106 of electronic device 100 may be configured to receive user account data 656 using any suitable communications protocol over any suitable communications path 75.

In response to receiving user account data 656 from server 310, device 100 may be configured to process user account data 656 and generate list request data 658 at step 608. For example, bank application 113 may be configured to receive user account data 656 from server 310, process user account data 656, and then generate and transmit list request data 658 to device application 103 at step 608 based on that processed user account data 656 and any other suitable data associated with bank application 113. List request data 658 may include a request for any appropriate secure element data. For example, list request data 658 may include an indication of at least one or each App ID that may be associated with bank application 113 (e.g., App ID 159d), such that certain data describing each credential SSD 154 that may be associated with a similar App ID may be shared with bank application 113. Bank application 113 may be configured to access such secure element data by communicating list request data 658 with device application 103 (e.g., an operating system application and/or a software developer kit ("SDK")) that may be available to processor 102 of device 100 and that may be configured to communicate with the bank online resource 113 via any suitable techniques (e.g., via one or more application programming interfaces ("APIs")). Device application 103 may be configured to access various types of information available to device 100 (e.g., from memory 104 and/or secure element 145). For example, device application 103 may be configured to access suitable information for every SSD 154 of secure element 145 (e.g., credential description information, App ID information, activation state information, and the like (e.g., from a CRS list of secure element 145)), and device application 103 may then be configured to filter such information so that only such information for each SSD 154 that is associated with an App ID that is also associated with bank application 113 (e.g., as may be indicated by list request data 658 of step 608 as received by device application 103) may be provided by device application 103 to bank application 113 as list response data 660 at step 610. Alternatively, device application 103 may be configured to access suitable information only for each SSD 154 of secure element 145 (e.g., from a CRS list of secure element 145) that may be associated with an App ID that is also associated with bank application 113 (e.g., as may be indicated by list request data 658 of step 608 as received by device application 103), and device application 103 may be configured to provide only that accessed information to bank application 113 as list response data 660 at step 610.

List response data 660 that may be provided to bank application 113 at step 610 may include any suitable information regarding any suitable data stored on secure element 145 that may be accessible by bank application 113 (e.g., any secure element data that may be associated with an App ID that is also associated with bank application 113). In some embodiments, such list response data 660 may include a list of any suitable descriptive information for each credential SSD 154 of secure element 145 that may share an App ID with bank application 113, such as a hashed or any other suitable version of an F-PAN or D-PAN of that credential SSD 154, a current activation state of that credential SSD 154, any suitable metadata of that credential SSD 154, and any other suitable data as may be mentioned below (e.g., one or more certificates that may enable a PAN to be suitably encrypted for use on secure element 145).

Next, at step 612, process 600 may include an electronic device comparing any suitable secure element list response data 660 that may be accessed at step 610 with any suitable user account data 656 that may be accessed at step 606, whereby such a comparison may identify and provide at least one possible credential management option on the electronic device as credential management option data 662. As mentioned, user account data 656 that may be received by bank application 113 at step 606 may include information indicative of one or more or account credentials associated with a user account (e.g., an account with which a user of device 100 has been authenticated via application 113 and/or server 310). Moreover, as mentioned, list response data 660 that may be received by bank application 113 at step 610 may include information indicative of each credential that may be at least partially provisioned or otherwise has an activation state on secure element 145 and that may be associated with application 113 (e.g., one or more credentials that may share an App ID with application 113). At step 612, device 100 (e.g., bank application 113, device application 103, and/or any other suitable component) may be configured to compare each account credential identified by user account data 656 with any secure element credential identified by list response data 660 (e.g., through comparing any suitable PAN data) in order to provide credential management option data 662 that may be indicative of at least one credential management option that may be available to system 1 based on that comparison. For example, as shown by screens 190*a*-190*d* of FIGS. 10A-10D, device 100 (e.g., application 113 via I/O interface 114*a*) may be configured to provide a user with one or more options for managing credentials on secure element 145 as credential management option data 662. For example, bank application 113 may use any suitable device APIs of device 100 to carry out one or more suitable comparisons at step 612. In some embodiments, bank application 113 may use one or more device APIs to collect the list response data (e.g., data 660) prior to bank application 113 being authenticated (e.g., prior to bank application 113 receiving user account data 656). In some embodiments, bank application 113 may share list response data 660 with bank server 310 (e.g., along with shared authentication data 654) and bank server 310 may be configured to carry out one or more suitable comparisons (e.g., at step 612 on bank server 310 rather than on device 100) and then bank server 310 may provide one or more suitable credential management options as option data 662 to device 100 for use in a UI of bank application 113.

As described above, in a first exemplary situation where secure element 145 may include first SSD 154*a* with a fully provisioned and enabled first SE credential of first applet 153*a* that may be associated with an App ID 159*a* equal to App ID 159*d* of application 113, as well as second SSD 154*b* with a partially provisioned but not yet enabled second SE credential of second applet 153*b* that may be associated with an App ID 159*b* equal to App ID 159*d* of application 113, but no third SSD 154*c*, then bank application 113 may be provided with list response data 660 at step 610 that may be indicative of the enabled first SE credential of SSD 154*a* and the disabled second SE credential of SSD 154*b* but not indicative of any third SE credential of SSD 154*c* (e.g., SSD 154*c* may not yet exist on secure element 145). For example, such list response data 660 may be indicative of an enabled first SE credential of SSD 154*a* that may be signed with an App ID matching the App ID of bank application 113 and that may have an active activation state. Additionally or alternatively, such list response data 660 may be indicative of a disabled second SE credential of SSD 154*b* that may be signed with an App ID matching the App ID of bank application 113 and that may have a requires activation state, an activation in progress state, or an activation terminated state. Additionally or alternatively, such list response data 660 may be indicative of a missing third SE credential of SSD 154*c* that may be signed with an App ID matching the App ID of bank application 113 and that may have a not provisioned state, a suspended state, or a disabled by issuer state. Additionally or alternatively, such list response data 660 may not be indicative of any third SE credential of any SSD 154*c* at all as that SSD may not yet exist on secure element 145.

Continuing with such a first exemplary situation, the user account data 656 that may be received by bank application 113 at step 606 may be indicative of three account credentials associated with a user's account, such as a first account credential A, a second account credential B, and a third account credential C. Through comparing such secure element data of list response data 660 with such account data of user account data 656 of this first exemplary situation (e.g., at step 612), bank application 113 may be configured to determine that first account credential A is the same as the enabled first SE credential of SSD 154*a*, that second account credential B is the same as the partially provisioned second SE credential of SSD 154*b*, and that third account credential C is the same as the missing second SE credential of SSD 154*c* or that third account credential C is not currently available in the form of an SE credential on secure element 145, and, in response to such comparing, bank application 113 may be configured to provide one or more credential management options (e.g., to a user of device 100) as credential management option data 662 at step 612. For example, as shown by screen 190*a* of FIG. 10A, device 100 may be configured to provide credential management option data 662 that may include at least one credential management option for at least one of the account credentials identified by user account data 656 of step 606 based on secure element list request data 660 of step 610 for this first exemplary situation. Specifically, screen 190*a* may include a listing of all three account credentials A, B, and C, as well as a listing of the status of each credential on secure element 145 of device 100, as well as a listing of at least one management option for each account credential (e.g., management option 1001*a* for facilitating the deletion of account credential A as the enabled first SE credential of SSD 154*a* from secure element 145, management option 1001*b* for facilitating the enablement of account credential B as the disabled second SE credential of SSD 154*b* on secure element 145, and/or management option 1001*c* for facilitating the addition of account credential C as a new third SE credential (e.g., of a new third SSD 154*c*) on secure element 145).

At step 614, after at least one credential management option may be provided by credential management option data 662 at step 612, process 600 may identify a selection of a provided credential management option (e.g., from a user of device 100, from bank application 113, from bank server 310, and/or from any other suitable entity of system 1) as credential management option selection data 664, and then, at one or more of steps 616-636, process 600 may carry out that identified option by managing a credential on secure element 145 in a particular way, after which process 600 may provide updated credential management option data 688 at step 638 that may include at least one updated credential management based on the credential management of one or more of steps 616-636. Such steps 616-638 may now be described with respect to various different credential management options that may be potentially identified as credential management option selection data 664 by process 600 at step 614. For example, continuing with the first exemplary situation, one of options 1001*a*-1001*c* provided by screen 190*a* as credential management option data 662 at step 612 may be selected at step 614 and, in response to providing screen 190*a* of FIG. 10A at step 614, a user may interact with device 100 (e.g., with I/O interface 114*a*) in one of many possible ways (e.g., with a user input selection of one of options 1001*a*-1001*c* as I/O input data 115*i* of FIG. 3) for managing a credential on secure element 145 (e.g., to delete a credential from secure element 145 through selection of option 1001*a*, to enable a disabled credential on secure element 145 through selection of option 1001*b*, or to add a credential on to secure element 145 through selection of option 1001*c*).

In some embodiments, credential management option selection data 664 may be indicative of a selection to add or install a "missing" credential on to secure element 145. For example, a user may choose option 1001*c* of FIG. 10A at step 614, and then process 600 may include one or more of steps 616-636 in which device 100 may communicate with bank server 310, commercial entity subsystem 400, and/or financial entity subsystem 350 in one or more various ways to add account credential C as a new third SE credential of SSD 154*c* on secure element 145, after which process 600 may provide updated credential management option data 688 based on the credential addition of steps 616-636 at step 638 (e.g., by providing screen 190*d* of FIG. 10D that may include a listing of all three account credentials A, B, and C, as well as a listing of the updated status of at least one credential on secure element 145 of device 100, as well as a listing of at least one updated management option for at least one account credential (e.g., management option 1007*a* for facilitating the deletion of account credential A as the newly enabled first SE credential of SSD 154*a* from secure element 145, management option 1007*b* for facilitating the enablement of account credential B as the disabled second SE credential of SSD 154*b* on secure element 145, and/or updated management option 1007*c* for facilitating the deletion of account credential C as recently added and enabled third SE credential of SSD 154*c* from secure element 145)).

In response to credential management selection data 664 identifying account credential C for such a credential add or install embodiment, step 616 may include device 100 generating and transmitting app request data 666 to server 310 that may be at least partially indicative of that selection of account credential C, which may be associated with a particular F-PAN. For example, bank application 113 may generate and/or transmit app request data 666 to bank server 310 at step 616. Such app request data 666 may be transmitted by electronic device 100 to server 310 at step 616 via communications path 75 of FIG. 1. For example, communications component 106 of electronic device 100 may be configured to transmit data 666 using any suitable communications protocol over any suitable communications path 75.

In response to receiving such app request data 666 at step 616, bank server 310 may be configured to generate and transmit app response data 668 back to device 100 at step 618. For example, app response data 668 may include any or all suitable data that may be needed by device 100 from server 310 to successfully add and enable a new credential on secure element 145. App response data 668 may include the full F-PAN and/or any suitable credential information related to selected account credential C that may be necessary for provisioning a credential for that F-PAN on secure element 145. In some embodiments, app response data 668 may include any suitable account credential information encrypted in any suitable way. For example, the F-PAN of selected account credential C may be encrypted, signed, and or formatted in any suitable way, such as by any suitable public key or certificate chain that may only be decrypted by an entity with access to an associated private key. In one embodiment, such a public key may be a secure mobile platform ("SMP") crypto services public key of commercial entity subsystem 400, which may be configured as a secure platform system and may include an SMP broker component, as described below in more detail, where commercial entity subsystem 400 may include an associated private key to decrypt that account credential F-PAN data of account response data 668 but that may not be decrypted by other components of system 1, such as a non-secure element component of device 100. Such a public key may be accessed by bank server 310 from commercial entity subsystem 400 directly. Additionally or alternatively, such a public key may be accessed by bank server 310 from secure element 145 of device 100 (e.g., via a portion of app request data 666 from bank application 113 via a portion of list response data 660 from device application 103/secure element 145 as a certificate chain). Such encryption may prevent a full F-PAN of an account credential from being received in an unencrypted state by device 100 or from being decrypted by an unsecure component of device 100 or another unsecure component of system 1.

As an example of such encryption by bank server 310, commercial entity subsystem 400 may be configured to transmit a certificate chain to device 100 prior to step 616 (e.g., a certificate chain may be provisioned on secure element 145 by commercial entity subsystem 400 at any suitable time prior to process 600), where such a certificate chain may be any suitable certificate chain, such as an X.509 certificate chain, which may be provided as at least a portion of CASD 158 (e.g., CASD access kit 158*k*). Then, at step 616, such a certificate chain may be provided to bank server 310 from secure element 145 of device 100 (e.g., via a portion of app request data 666 from bank application 113 (e.g., via a portion of list response data 660 from device application 103/secure element 145)), for example, as an entrusted intermediary. Then, bank server 310 may receive such a certificate chain and validate that received certificate chain according to any suitable documentation that may be associated with such a type of certificate chain. In some embodiments, such validation may include bank server 310 validating that the received chain terminates in a "root certificate" that may be known to be controlled by commercial entity subsystem 400 (e.g., an X.509v3 "root certificate" that may be known and controlled by commercial entity subsystem 400 or any other suitable subsystem that may be associated with electronic device 100 and/or secure element 145). By validating the received certificate independently, bank server 310 may verify that device 100 has correctly executed its role as an intermediary and/or that code or other mechanisms that may be executing on device 100 have not tampered with the shared certificate chain. Next, bank server 310 may perform any suitable formatting on the F-PAN to be shared at step 618 using any suitable portion of the certificate chain. For example, bank server 310 may perform a cryptographic message syntax "enveloping" on the F-PAN to be shared at step 618 (e.g., sign and encrypt the F-PAN) using a public key of the "leaf" (e.g., the end entity) certificate in the received certificate chain. Then, bank server 310 may provide device 100 with such a formatted (e.g., enveloped) representation of the F-PAN as at least a portion of account response data 668 at step 618. Such a process may enable system 1 to use the same infrastructure for provisioning credentials on device 100 from bank server 310 that may also be used for a user of device 100 manually entering credential information into device 100 for provisioning a credential (e.g., in a set-up or "Passbook" implementation via device application 103 of device 100). Additionally or alternatively, by requiring that bank application 113 use an API on device 100 for provisioning a credential on secure element 145 during such a process, a degree of control over the experience can be exercised on device 100 (e.g., certain terms and conditions may be provided to a user (e.g., via a GUI 180). Additionally or alternatively, such a process may enable certain account information (e.g., the F-PAN of the account credential to be added) to be cryptographically protected from being accessed maliciously while traveling through device 100, and/or may be only known at bank server 310 (e.g., before enveloping) and commercial entity subsystem 400 (e.g., after decryption, as may be described below with respect to step 624).

App response data 668 may also include any suitable password data (e.g., a one-time password ("OTP") or any other suitable authentication data) that may be shared with electronic device 100 at step 618 for eventual use in enabling a provisioned but disabled credential on secure element 145 of device 100. Such password data may be an alphanumeric password (e.g., a random numeric OTP generated by bank server 310 and/or a payment network 360). Additionally or alternatively, such password data may be a cryptographic password (e.g., an encrypted password that may not be decrypted by commercial entity subsystem 400 and/or an unsecure component of device 100, but that may be decrypted by financial institution subsystem 350 (e.g., a payment network 360 that may be associated with the account credential C of app response data 668)). A predefined cryptography scheme may be agreed upon between an associated payment network 360 and bank server 310 and/or an issuing bank 370 of the account credential C in order to avoid the need for bank server 310 and/or an issuing bank 370 of account credential C from communicating with any associated payment network 360 at this step. Alternatively, such a cryptography scheme and/or such password data may be agreed upon between an associated payment network 360 and bank server 310 and/or an issuing bank 370 of the account credential C during process 600 after receipt of app request data 666 (e.g., based on network-bank data 667 that may be communicated therebetween at step 617). In some embodiments, both such password data and such credential PAN data may be encrypted before being transmitted as app response data 668 at step 618 (e.g., by an SMP public key mentioned above). Such app response data 668 may be transmitted by server 310 to electronic device 100 at step 618 via communications path 75 of FIG. 1. For example, communications component 106 of electronic device 100 may be configured to receive app response data 668 using any suitable communications protocol over any suitable communications path 75.

In some embodiments, any suitable alphanumeric OTP may be used, which may be something that can be user-enterable on device 100 (e.g., an OTP sent to a user as an identity verification mechanism, where identification of the customer may be considered lower risk because the customer may be able to receive such an OTP, such as from bank server 310 and/or financial institution subsystem 350). Additionally or alternatively, any suitable cryptographic OTP may be used, which may be longer and/or more unique than an alphanumeric OTP (e.g., a globally unique identifier ("GUID")), where such a cryptographic OTP may be used such that financial institution subsystem 350 (e.g., a payment network subsystem 360 associated with the credential) may be able to validate data of the cryptographic OTP as being signed and/or otherwise generated or approved by bank server 310 and/or an issuing bank subsystem 370 associated with the credential and such that financial institution subsystem 350 (e.g., a payment network subsystem 360 associated with the credential) may not have to refer back to bank server 310 and/or an issuing bank subsystem 370 associated with the credential to confirm that the cryptographic OTP was confirm its origin. Such a cryptographic OTP may be an attestation by bank server 310 and/or an issuing bank subsystem 370 associated with the credential that the user has already been verified or otherwise authenticated to that entity's satisfaction (e.g., at steps 602-606). For example, a bank server 310 that may use such a cryptographic OTP may do so because the customer has logged into the online banking function of the bank application 113 and/or performed some other verification step demanded by the bank. Such a cryptographic OTP may not be intended to be human-readable, but instead intended only to make the round trip from bank server 310, through device 100, through commercial entity subsystem 400, and to financial entity subsystem 350 (e.g., as described with respect to steps 616-626), which may prove that bank server 310 has authorized the provisioning of the credential.

In response to app response data 668 being generated and transmitted to device 100 at step 618, device 100 may receive such app response data 668 and then generate and transmit device pass request data 672 to commercial entity subsystem 400 for carrying out the complete provisioning of a new credential on secure element 145. For example, in response to receiving app response data 668 at step 618, bank application 113 may be configured to process that app response data 668 and appropriately instruct device application 103 with app pass request data 670 at step 620 (e.g., as an API call) to initiate one or more appropriate credential management request processes with commercial entity subsystem 400 for provisioning account credential C on secure element 145. Such app pass request data 670 may include some or all of app response data 668, for example, including a full F-PAN of the account credential C and an associated password in any suitable encrypted form. In response to receiving such an instruction with app pass request data 670, device application 103 may be configured to interact with secure element 145 and/or any other suitable information accessible by device application 103 on device 100 in order to generate and transmit device pass request data 672 to commercial entity subsystem 400 at step 622. According to this example, such device pass request data 672 may be an enroll card request that may include any suitable information indicative of selected account credential C (e.g., the full F-PAN from app response data 668) as well as any other suitable information that may be useful to commercial entity subsystem 400 for enabling the provisioning of selected account credential C on device 100 (e.g., an SSD identifier, which may be indicative of an available SSD 154 of NFC component 120 of device 100 that may be able to receive such a provisioned credential (e.g., currently empty or not utilized SSD 154c), as may be determined by secure element 145 at step 622). Additionally or alternatively, such device pass request data 672 may include any suitable security information associated with the selected credential that may be used by financial institution subsystem 350 for provisioning that credential onto device 100. For example, such credential security information of device pass request data 672 may include a card verification code ("CVV") for the selected credential, which may be provided by app response data 668 from bank server 310 and/or entered by a user at device 100. For example, although not shown, in response to a user selection of install/add option 1001c of screen 190a for adding account credential C to secure element 145, GUI 180 of device 100 may be configured to provide a screen that may prompt the user to authenticate the selected credential in one or more ways (e.g., by entering security information, such as the CVV of the selected credential and/or any other suitable security information that may be required by system 1 (e.g., by financial institution subsystem 350) for provisioning the selected credential on device 100). Alternatively, a user's previous authentication with bank application 113 (e.g., at step 602) may obviate the need for such additional credential-specific authentication. Additionally or alternatively, such credential security information of device pass request data 672 may include the password data provided by app response data 668 from bank server 310 at step 618 and not require any additional security information from device 100. Such bank server 310 provided password data may be used instead of a user-entered CVV due to the fact that bank server 310 (e.g., an issuing bank subsystem 370) associated with the credential may be integrally involved in making the request to provision account credential C on device 100 (e.g., at step 618). Such device pass request data 672 may be transmitted by electronic device 100 to commercial entity subsystem 400 at step 622 via communications path 65 of FIG. 1. For example, communications component 106 of electronic device 100 may be configured to transmit data 672 using any suitable communications protocol over any suitable communications path 65. Device 100 and commercial entity subsystem 400 may be configured to use any suitable data encryption schemes (e.g., via shared keys) for preventing any data communicated therebetween from being intercepted and utilized maliciously.

Next, in response to receiving such device pass request data 672 from device 100, commercial entity subsystem 400 may attempt to retrieve encrypted information regarding the selected account credential that may be suitable for communication by commercial entity subsystem 400 to financial institution subsystem 350 at step 624 as commercial pass request data 674. For example, at step 624 of process 600 of FIG. 6, commercial entity subsystem 400 may pull specific data from the received device pass request data 672 (e.g., information indicative of the selected credential (e.g., encrypted F-PAN information from app response data 668 of bank server 310, as described above, which may be enveloped using a certificate chain associated with subsystem 400), and/or any additional security information for the selected credential (e.g., password data from app response data 668 of bank server 310 and/or any user provided security data such as a CVV)). In some embodiments, commercial entity subsystem 400 may be configured to commission one or more security check processes in response to receiving device pass request data 672 for determining any fraud risk that may be associated with the account credential identified by device pass request data 672. For example, commercial entity subsystem 400 may be configured to conduct a commercial entity fraud check for the identified credential that may attempt to retrieve a commercial entity risk score for the identified credential (e.g., based on any commercial entity user account information that may be accessible to commercial entity subsystem 400) and/or to conduct a financial institution fraud check for the identified credential that may attempt to retrieve a financial institution risk score for the identified credential (e.g., based on any financial institution user account information that may be accessible to commercial entity subsystem 400 via financial institution subsystem 350), as may be described in co-pending U.S. patent application Ser. No. 14/092,205, filed on Nov. 22, 2013, which is hereby incorporated by reference herein in its entirety. Alternatively, in some embodiments, such a financial institution fraud check may be deemed unnecessary by commercial entity subsystem 400 in response to determining that device pass request data 672 has been received based on app pass request data 670 from a bank application 113 that has already authenticated a user (e.g., at step 604). Moreover, in response to commercial entity subsystem 400 receiving such device pass request data 672 from device 100, an SSD may be created by commercial entity subsystem 400 (e.g., an identifier for an SSD of device 100 (e.g., an SSD 154 of NFC component 120) into which the identified credential is to be provisioned), which may be at least partially determined based on certain secure element information provided by device pass request data 672 from device 100).

Next, after retrieving information regarding the selected account credential from device pass request data 672, after running any suitable fraud checks, and/or after creating an SSD, commercial entity subsystem 400 may generate and transmit commercial pass request data 674 at step 624 to financial institution subsystem 350 for requesting the provisioning of the selected credential on device 100 (e.g., as a "LinkAndProvisionRequest" to financial institution subsystem 350). In some embodiments, such commercial pass request data 674 may include any suitable data that financial institution subsystem 350 may use to begin provisioning the selected credential on device 100, such as data indicative of the selected credential that may be retrieved by commercial entity subsystem 400 from the received device pass request data 672, such as information indicative of the selected credential (e.g., F-PAN information from app response data 668 of bank server 310 that may be decrypted by commercial entity subsystem 400 using a key associated with the encrypting key used by bank server 310 at step 618), and/or any additional security information for the selected credential (e.g., password data from app response data 668 of bank server 310 and/or any user provided security data such as a CVV), as well as an identification of the SSD of device 100 into which the credential is to be provisioned (e.g., SSD 154c as determined above). Such commercial pass request data 674 generated by commercial entity subsystem 400 may be transmitted by commercial entity subsystem 400 to financial institution subsystem 350 at step 624 via communications path 55 of FIG. 1 using any suitable communications protocol over any suitable communications path type (e.g., via a TSM of communications path 55). Commercial entity subsystem 400 and financial institution subsystem 350 may be configured to use any suitable data encryption schemes (e.g., via shared keys) for preventing any data communicated therebetween from being intercepted and utilized maliciously.

In response to receiving such commercial pass request data 674 from commercial entity subsystem 400, financial institution subsystem 350 (e.g., a payment network subsystem 360 that may be associated with the credential being provisioned) may be configured to generate a descriptor of the selected credential to be provisioned, as well as visual artwork and other metadata that may be provided on device 100 for aiding user interaction with the credential once provisioned. For example, at step 626 of process 600 of FIG. 6, financial institution subsystem 350 may pull specific data from the received commercial pass request data 674 (e.g., the credential identification information for the selected credential), access one or more databases of information available to financial institution subsystem 350 that may be useful for generating one or more descriptors and/or various types of metadata that may aid any eventual user interaction with the credential once provisioned on device 100, and then financial institution subsystem 350 may transmit appropriate network pass data 676 (e.g., a "LinkAndProvisionResponse") back to commercial entity subsystem 400 at step 626 based on such generated information. Such network pass data 676 may include a descriptor of the credential to be provisioned and any suitable metadata that ought to be provided on device 100 for aiding user interaction with the credential to be provisioned. For example, network pass data 676 may include some or all suitable data that may enable device 100 to make the credential visually appear as available to device 100, such as visual logos/icons and other user discernible data associated with the credential that may be provided to the user (e.g., when the specific icon 182 labeled with a "Passbook" textual indicator 181 (i.e., specific icon 185) of FIG. 4 is selected, device 100 may launch or otherwise access a specific passbook or wallet application and may display screens of a specific user interface that may include one or more visual descriptors of the credential, and/or on screen 190d adjacent option 1007c where credential C may be indicated as enabled on device 100 via bank application 113). Such network pass data 676 generated by financial institution subsystem 350 may be transmitted by financial institution subsystem 350 (e.g., by an appropriate payment network subsystem 360) to commercial entity subsystem 400 at step 626 via communications path 55 of FIG. 1 using any suitable communications protocol over any suitable communications path type (e.g., via a TSM of communications path 55). Financial institution subsystem 350 and commercial entity subsystem 400 may be configured to use any suitable data encryption schemes (e.g., via shared keys) for preventing any data communicated therebetween from being intercepted and utilized maliciously.

As mentioned, in some embodiments, system 1 and/or process 600 may be configured to provision a virtual credential (e.g., a D-PAN) on device 100 rather than the actual credential (e.g., an F-PAN) that may be associated with the user's account credential C. For example, once it is determined that a credential is to be provisioned on device 100, it may be requested (e.g., by financial institution subsystem 350, by commercial entity subsystem 400, by bank server 310, and/or by a user of device 100) that a virtual credential be generated, linked to the actual credential, and provisioned on device 100 instead of the actual credential. That is, commercial entity subsystem 400 may generate and transmit commercial pass request data 674 to financial institution subsystem 350 at step 624 that may also include a specific instruction for financial institution subsystem 350 to link and provision a virtual credential (e.g., a device primary account number ("D-PAN")) with the selected actual credential (i.e., a funding primary account number ("F-PAN") originally issued by the issuing bank), and, accordingly, financial institution subsystem 350 may generate and transmit network pass data 676 back to commercial entity subsystem 400 at step 626 that may include a descriptor of the virtual credential (e.g., the D-PAN) to be provisioned and any suitable metadata that ought to be provided on device 100 for aiding user interaction with the virtual credential to be provisioned. Such linking and provisioning of a virtual credential with an actual credential may be performed by any suitable component of financial institution subsystem 350. For example, a payment network subsystem 360 (e.g., a particular payment network subsystem 360 that may be associated with the brand of the actual credential selected during steps 614-618) may define and store virtual-linking table 352 (e.g., as shown in FIG. 1A) that may create associations between the actual credential and a virtual credential, such that anytime a virtual credential is utilized by device 100 for a financial transaction with merchant subsystem 200 (e.g., after being provisioned on device 100), payment network subsystem 360 may receive an authorization request indicative of that virtual credential (e.g., as data 395) and may conduct an analysis of that authorization request in light of the actual credential associated with the virtual credential as determined by table 352. By provisioning a virtual credential on device 100 rather than an actual credential, financial institution subsystem 350 may be configured to limit the fraudulent activity that may result when the virtual credential is intercepted by an unauthorized user (e.g., by an NFC communication 15 signal stealer), as payment network subsystem 360 may only be configured to utilize table 352 for linking the virtual credential to the actual credential during certain transactions (e.g., during NFC transactions and not online transactions or other transactions that may allow credential information to be manually entered by a user).

Next, in response to receiving network pass data 676 at step 626, commercial entity subsystem 400 may pass some or all of the information contained in that network pass data 676 to device 100 as commercial pass data 678 at step 628 in order to at least partially prepare device 100 for having a credential provisioned thereon. For example, at step 328 of process 600, commercial entity subsystem 400 may analyze the received network pass data 676 and may then generate and transmit a "Pass" to electronic device 100 as at least a portion of commercial pass data 678. Such a pass may include any suitable description or identification of the credential to be provisioned (e.g., a hashed-version of the credential number, virtual or actual, as well as any associated metadata, all of which may be provided by network pass data 676). Such a pass may also include information associated with the particular SSD 154 of device 100 that may have the credential provisioned thereon (e.g., an SSD identifier, as may be provided by the device pass request data 672 of step 622 and/or as may be created by commercial entity subsystem 400). Such a pass generated by commercial entity subsystem 400 may be transmitted by commercial entity subsystem 400 to electronic device 100 as at least a portion of commercial pass data 678 via communications path 65 of FIG. 1. For example, communications component 106 of electronic device 100 may be configured to receive data 678 using any suitable communications protocol over any suitable communications path 65. Commercial entity subsystem 400 and electronic device 100 may be configured to use any suitable data encryption schemes (e.g., via shared keys) for preventing any data communicated therebetween from being intercepted and utilized maliciously. Alternatively, in some embodiments, such network pass data 676 generated by financial institution subsystem 350 may be transmitted by financial institution subsystem 350 directly to electronic device 100 as at least a portion of commercial pass data 678 via communications path 75 of FIG. 1 without using commercial entity subsystem 400 as an intermediary.

For example, communications component 106 of electronic device 100 may be configured to receive such data 678 using any suitable communications protocol over any suitable communications path 75. Financial institution subsystem 350 and electronic device 100 may be configured to use any suitable data encryption schemes (e.g., via shared keys) for preventing any data communicated therebetween from being intercepted and utilized maliciously.

Next, in response to receiving such a pass, device 100 may automatically generate and add a disabled pass to a particular SSD 154 of NFC memory module 150 (e.g., without any required user interaction). For example, at step 630 of process 600, device application 103 may process the received pass and may then generate and send SE pass data 680 (e.g., as a "DisabledPass") at step 630 to an SSD 154 of NFC memory module 150 (e.g., to a particular SSD 154 that may be identified by the received pass (e.g., SSD 154*c*)). In such embodiments, SSD 154*c* may receive such SE pass data 680 and update credential information on secure element 145 at step 632 (e.g., by populating at least a portion of SSD 154*c* with any suitable pass data). In response to such an update at step 632, secure element 145 (e.g., a CRS application) may be configured to generate and share SE pass confirmation data 684 with device application 103 at step 634 that may be indicative of such an update of SSD 154*c* with a disabled pass. In response to receiving such SE pass confirmation data 684 at step 634, device application 103 may be configured to generate and share device pass confirmation data 686 with bank application 113 at step 636 that may be indicative of such an update of SSD 154*c* with a disabled pass. Thereafter, bank application 113 may use such device pass confirmation data 686 to provide updated credential management option data 688 to a user of bank application 113 at step 638 that may be indicative of such an update of SSD 154*c* with a disabled pass (e.g., on a GUI screen that may indicate a current device status of "Disabled" for currently-being provisioned account credential C (not shown)). For example, such updated credential management option data 688 for a disabled credential may enable device 100 (e.g., via bank application 113) to make the credential visually appear as disabled but provisioned on device 100, such as visual logos/icons and other user discernible data associated with the credential that may be provided to the user.

Continuing with the example of provisioning a new credential on secure element 145, at least partially concurrently with an initial step 626 that may generate the above-described "LinkAndProvisionResponse" network pass data 676, financial institution subsystem 350 may initiate generation and transmission of additional network pass data 676 (e.g., as "putPending commands") to commercial entity subsystem 400 and, thus, device 100. For example, at another iteration of step 626 of process 600 and/or during the same step 626 described above, financial institution subsystem 350 may generate and transmit one or more "putPendingCommands" as at least a portion of network pass data 676 to commercial entity subsystem 400. In some embodiments, such putPendingCommands network pass data 676 may include the primary account number (e.g., D-PAN or F-PAN, hashed or not), an SSD identifier, and/or an SSD counter. Then, in response to receiving such putPendingCommands, commercial entity subsystem 400 may generate and transmit at least a portion of commercial pass data 678 (e.g., as a "notify" command) to device 100 at step 628 that may include one or more persoScripts or GlobalPlatform application protocol data unit ("APDU") scripts (e.g., any scripts, any rotate keys (e.g., if necessary), and/or any other suitable administrative elements that may be used to provision a usable PAN on device 100). Next, in response to receiving such a notify command from commercial entity subsystem 400 at step 628, device 100 may complete any of the received scripts from the notification of that step 628 for enabling the recently provisioned but disabled credential (e.g., for toggling the credential from disabled/pending activation to enabled/active for use). For example, at a second iteration of step 630 of process 600, device application 103 may process the received notification from commercial pass data 678 and may then generate and send SE pass data 680 (e.g., as an "EnablePass") at step 630 to an SSD 154 of NFC memory module 150 (e.g., to a particular SSD 154 that may be identified by the received pass (e.g., SSD 154*c*)). In such embodiments, SSD 154*c* may receive such SE pass data 680 and update credential information on secure element 145 at step 632 (e.g., by enabling the recently populated SSD 154*c*). In response to such an update at step 632, secure element 145 (e.g., a CRS application) may be configured to generate and share SE pass confirmation data 684 with device application 103 at step 634 that may be indicative of such an update of SSD 154*c* with an enabled pass. In response to receiving such SE pass confirmation data 684 at step 634, device application 103 may be configured to generate and share device pass confirmation data 686 with bank application 113 at step 636 that may be indicative of such an update of SSD 154*c* with an enabled pass. Thereafter, bank application 113 may use such device pass confirmation data 686 to provide updated credential management option data 688 to a user of bank application 113 at step 638 that may be indicative of such an update of SSD 154*c* with an enabled pass (e.g., as shown by an updated device status adjacent option 1007*c* of screen 190*d* of FIG. 10D for newly enabled account credential C).

Such "putPending commands" network pass data 676 may be generated and transmitted by financial institution subsystem 350 concurrently with or shortly after such "LinkandProvisionResponse" network pass data 676 for immediately facilitating the enablement of the new credential pass on secure element 145 when a suitable password for that credential is provided to financial institution subsystem 350 (e.g., as at least a portion of commercial pass request data 674, which may be based on such password data that may be provided via bank server 310 as at least a portion of app response data 668 at step 618). For example, when such a process for provisioning and enabling a new account credential on device 100 is initiated by a user authenticated bank application 113 of bank server 310, and such suitable password data may be provided to financial institution subsystem 350 (e.g., as at least a portion of commercial pass request data 674), financial institution subsystem 350 may be configured to automatically and/or immediately enable the credential being provisioned on device 100. Password data may be generated or otherwise provided by bank server 310 (e.g., through a key exchange with a network operator) and may share such password data with bank application 113, and bank application 113 may hand such password data to a device API or pass such password data through the device API to commercial entity subsystem 400, and commercial entity subsystem 400 may then send such password data to financial entity subsystem 350 to confirm the authenticity and/or validity of such password data.

Password data may be utilized by electronic device 100 to enable a provisioned but disabled credential on the electronic device. In some embodiments, the provisioned but disabled credential may be provided on the electronic device using at least one communication mechanism that may differ from the particular communication mechanism identified and used to communicate the credential password data to the electronic device. Such password data may be configured as a one-time password ("OTP") that may be utilized only once in conjunction with a specific reciprocal data element for enabling a provisioned credential, such that an intruder who may manage to intercept such password data that has already been used by device 100 may not be used by that intruder. Any suitable provisioning data element or elements that may be received by device 100 for provisioning a selected credential on device 100 (e.g., any suitable data element(s) of pass data from commercial pass data 678 and/or any suitable data element(s) of notification data from commercial pass data 678) may be initially generated and transmitted by financial entity subsystem 350 (e.g., as any suitable data element(s) of "LinkAndProvisionResponse" data from network pass data 676 and/or any suitable data element(s) of "putPendingCommands" data from network pass data 676) in any suitable way that may enable such provisioning data element(s) to be used by device 100 in combination with credential password data for enabling a credential on device 100 (e.g., at step 632), where such password data 568 may be received by device 100 from bank server 310 as at least a portion of app response data 668 and/or from commercial institution subsystem 400 as at least a portion of commercial pass data 678. For example, such a provisioning data element may be any suitable persoScript or GlobalPlatform APDU script of data 676/678 (e.g., a locked passcode for an applet 153c provisioned in appropriate SSD 154c for the selected account credential C), and such password data may be any suitable data that may be uniquely configured to interact in any suitable way with the provisioning data element at step 632 (e.g., to unlock a locked passcode for enabling applet 153c provisioned in appropriate SSD 154c for selected account credential C) for enabling a provisioned but disabled credential on device 100. Therefore, at an iteration of step 632, in response to receiving or otherwise accessing appropriate password data, device 100 may complete any of the received scripts from pass data 678 and/or notification data 678 for enabling the credential (e.g., for toggling the credential from a disabled/pending activation state to an enabled/active for use state).

As mentioned, at least one App ID may be associated with a credential provisioned on an electronic device, such that only credentials sharing an App ID with that of an application running on the electronic device may be made accessible to that application. For example, the new credential provisioned and enabled in SSD 154c of secure element 145 for account credential C, as described above, may be associated with an App ID 159c (e.g., as shown in FIG. 3). In some embodiments, such an App ID for a particular credential being provisioned on a secure element may be selected and provided by financial institution subsystem 350 (e.g., a payment network subsystem 360 that may be associated with the credential, an issuing bank subsystem 370 that may be associated with the credential, and/or a bank server 310 that may be associated with the credential) and/or by bank application 113 that may have initiated the credential provisioning process. For example, "LinkAndProvisionResponse" data from network pass data 676 may be indicative of at least one particular App ID (e.g., App ID 159c) that may be signed into the credential data being provisioned on device 100 (e.g., by financial institution subsystem 350 and/or commercial entity subsystem 400 (e.g., before transmitting commercial pass data 678)). In some embodiments, a payment network subsystem 360 that may be associated with the credential may provide such App ID data to commercial entity subsystem 400 as at least a portion of network pass data 676 at step 626, where such App ID data may be provided to that payment network subsystem 360 by bank server 310 and/or an issuing bank subsystem 370 that may be associated with the credential. For example, when generating and transmitting app response data 668 at step 618, bank server 310 may identify the App ID of its associated bank application 113 requesting the credential provisioning (e.g., App ID 159d of FIG. 3, via authentication data 654 and/or app request data 666) and may associate that bank application App ID with the credential App ID to be signed into the credential data being provisioned on device 100 (e.g., by including such a credential App ID (e.g., App ID 159c) as a portion of app response data 668 and/or by providing such a credential App ID to a payment network subsystem 360 that may be associated with that credential to be provisioned (e.g., for later use by that payment network subsystem 360 at step 626 when generating network pass data 676).

Therefore, process 600 may provide a more seamless user experience when a user is interfacing with or otherwise using an online resource 113 on device 100, where that online resource 113 may be associated with one or more account credentials that have not yet been provisioned and enabled on device 100, such that the account credential may be provisioned on device 100 through limited user interaction with online resource 113. Such management of one or more credentials on a secure element 145 of electronic device 100 through user interaction with an online resource 113 may increase the functionality of the online resource and/or enhance a user's experience with device 100 and its credential management abilities.

In some embodiments, credential management option selection data 664 may be indicative of a selection to enable a "disabled" credential on secure element 145. For example, a user may choose option 1001b of FIG. 10A at step 614, and then process 600 may include one or more of steps 616-636 in which device 100 may communicate with bank server 310, commercial entity subsystem 400, and/or financial entity subsystem 350 in one or more various ways to enable account credential B as the disabled second SE credential of SSD 154b on secure element 145, after which process 600 may provide updated credential management option data 688 based on the credential enablement of steps 616-636 at step 638 (e.g., by providing screen 190c of FIG. 10C that may include a listing of all three account credentials A, B, and C, as well as a listing of the updated status of at least one credential on secure element 145 of device 100, as well as a listing of at least one updated management option for at least one account credential (e.g., management option 1005a for facilitating the deletion of account credential A as the enabled first SE credential of SSD 154a from secure element 145, updated management option 1005b for facilitating the deletion of account credential B as the recently enabled second SE credential of SSD 154b on secure element 145, and/or management option 1005c for facilitating the addition of account credential C as a new third SE credential (e.g., of a new third SSD 154c) on secure element 145)).

In response to credential management selection data 664 identifying account credential B for such a credential enablement embodiment, step 616 may include device 100 generating and transmitting app request data 666 to server 310 that may be at least partially indicative of that selection of account credential B, which may be associated with a particular F-PAN, as well as the currently disabled activation state of that account credential B. For example, bank application 113 may generate and/or transmit app request data 666 to bank server 310 at step 616. Such app request data 666 may be transmitted by electronic device 100 to server 310 at step 616 via communications path 75 of FIG. 1. For example, communications component 106 of electronic device 100 may be configured to transmit data 666 using any suitable communications protocol over any suitable communications path 75. Device 100 (e.g., application 113) and server 310 may be configured to use any suitable data encryption schemes (e.g., via shared keys) for preventing any data communicated therebetween from being intercepted and utilized maliciously.

In response to receiving such app request data 666 at step 616, bank server 310 may be configured to generate and transmit app response data 668 back to device 100 at step 618. For example, app response data 668 may include any or all suitable data that may be needed by device 100 from server 310 to successfully enable the currently disabled credential of SSD 154b of secure element 145 that may be associated with selected account credential B. App response data 668 may include any suitable password data (e.g., a one-time password ("OTP") or any other suitable authentication data) that may be shared with electronic device 100 at step 618 for eventual use in enabling a provisioned but disabled credential on secure element 145 of device 100. Such password data may be an alphanumeric password (e.g., a random numeric OTP generated by bank server 310 and/or a payment network 360). Additionally or alternatively, such password data may be a cryptographic password (e.g., an encrypted password that may not be decrypted by commercial entity subsystem 400 and/or an unsecure component of device 100, but that may be decrypted by financial institution subsystem 350 (e.g., a payment network 360 that may be associated with the account credential B identified by app request data 666)). A pre-defined cryptography scheme may be agreed upon between an associated payment network 360 and bank server 310 and/or an issuing bank 370 of the account credential B in order to avoid the need for bank server 310 and/or an issuing bank 370 of account credential B from communicating with any associated payment network 360 at this step. Alternatively, such a cryptography scheme and/or such password data may be agreed upon between an associated payment network 360 and bank server 310 and/or an issuing bank 370 of the account credential B during process 600 after receipt of app request data 666 (e.g., based on network-bank data 667 that may be communicated therebetween at step 617). In some embodiments, such password data may be encrypted before being transmitted as app response data 668 at step 618 (e.g., by an SMP public key mentioned above). Such app response data 668 may be transmitted by server 310 to electronic device 100 at step 618 via communications path 75 of FIG. 1. For example, communications component 106 of electronic device 100 may be configured to receive app response data 668 using any suitable communications protocol over any suitable communications path 75.

In response to app response data 668 being generated and transmitted to device 100 at step 618, device 100 may receive such app response data 668 and then generate and transmit device pass request data 672 to commercial entity subsystem 400 for carrying out the enablement of the currently disabled credential on secure element 145. For example, in response to receiving app response data 668 at step 618, bank application 113 may be configured to process that app response data 668 and appropriately instruct device application 103 with app pass request data 670 at step 620 (e.g., as an API call) to initiate one or more appropriate credential management request processes with commercial entity subsystem 400 for enabling account credential B on secure element 145. Such app pass request data 670 may include some or all of app response data 668, for example, including an associated password. In response to receiving such an instruction with app pass request data 670, device application 103 may be configured to interact with secure element 145 and/or any other suitable information accessible by device application 103 on device 100 in order to generate and transmit device pass request data 672 to commercial entity subsystem 400 at step 622. According to this example, such device pass request data 672 may be a resume card request that may include any suitable information indicative of selected account credential B (e.g., a hashed PAN or any other suitable identifier) as well as any other suitable information that may be useful to commercial entity subsystem 400 for enabling the currently disabled credential associated with account credential B on device 100 (e.g., an SSD identifier, which may be indicative of SSD 154b of NFC component 120 of device 100 that may currently include data for the disabled credential, as may be determined by secure element 145 at step 622). Additionally or alternatively, such device pass request data 672 may include any suitable security information associated with the selected credential that may be used by financial institution subsystem 350 for enabling that credential onto device 100. For example, such credential security information of device pass request data 672 may include a card verification code ("CVV") for the selected credential, which may be provided by app response data 668 from bank server 310 and/or entered by a user at device 100. For example, although not shown, in response to a user selection of enable option 1001b of screen 190a for enabling currently disabled account credential B on secure element 145, GUI 180 of device 100 may be configured to provide a screen that may prompt the user to authenticate the selected credential in one or more ways (e.g., by entering security information, such as the CVV of the selected credential and/or any other suitable security information that may be required by system 1 (e.g., by financial institution subsystem 350) for provisioning the selected credential on device 100). Alternatively, a user's previous authentication with bank application 113 (e.g., at step 602) may obviate the need for such additional credential-specific authentication. Additionally or alternatively, such credential security information of device pass request data 672 may include the password data provided by app response data 668 from bank server 310 at step 618 and may not require any additional security information from device 100. Such bank server 310 provided password data may be used instead of a user-entered CVV due to the fact that bank server 310 (e.g., an issuing bank subsystem 370) associated with the credential may be integrally involved in making the request to enable account credential B on device 100 (e.g., at step 618). Such device pass request data 672 may be transmitted by electronic device 100 to commercial entity subsystem 400 at step 622 via communications path 65 of FIG. 1. For example, communications component 106 of electronic device 100 may be configured to transmit data 672 using any suitable communications protocol over any suitable communications path 65. Device 100 and commercial entity subsystem 400 may be configured to use any suitable data encryption schemes (e.g., via shared keys) for preventing any data communicated therebetween from being intercepted and utilized maliciously.

Next, in response to receiving such device pass request data 672 from device 100, commercial entity subsystem 400 may attempt to retrieve any information regarding the selected account credential B that may be suitable for communication by commercial entity subsystem 400 to financial institution subsystem 350 at step 624 as commercial pass request data 674. For example, at step 624 of process 600 of FIG. 6, commercial entity subsystem 400 may pull specific data from the received device pass request data 672 (e.g., information indicative of the selected credential and/or information indicative of requesting device 100 and/or any additional security information for the selected credential (e.g., password data from app response data 668 of bank server 310 and/or any user provided security data such as a CVV)).

Next, after retrieving information regarding the selected account credential from device pass request data 672, and after running any suitable fraud checks, commercial entity subsystem 400 may generate and transmit commercial pass request data 674 at step 624 to financial institution subsystem 350 for requesting the enablement of the selected credential on device 100 (e.g., as a "ResumeRequest" to financial institution subsystem 350). In some embodiments, such commercial pass request data 674 may include any suitable data that financial institution subsystem 350 may use to validate and/or enable the selected credential on device 100, such as data indicative of the selected credential that may be retrieved by commercial entity subsystem 400 from the received device pass request data 672, such as information indicative of the selected credential (e.g., hashed PAN information from app response data 668 of bank server 310 that may be decrypted by commercial entity subsystem 400 using a key associated with the encrypting key used by bank server 310 at step 618), and/or any additional security information for the selected credential (e.g., password data from app response data 668 of bank server 310 and/or any user provided security data such as a CVV), as well as an identification of the SSD of device 100 into which the credential is to be enabled (e.g., SSD 154*b* as determined above). Such commercial pass request data 674 generated by commercial entity subsystem 400 may be transmitted by commercial entity subsystem 400 to financial institution subsystem 350 at step 624 via communications path 55 of FIG. 1 using any suitable communications protocol over any suitable communications path type (e.g., via a TSM of communications path 55). Commercial entity subsystem 400 and financial institution subsystem 350 may be configured to use any suitable data encryption schemes (e.g., via shared keys) for preventing any data communicated therebetween from being intercepted and utilized maliciously.

In response to receiving such commercial pass request data 674 from commercial entity subsystem 400, financial institution subsystem 350 (e.g., a payment network subsystem 360 that may be associated with the credential being provisioned) may be configured to authenticate any suitable information of commercial pass request data 674 in order to ensure that the selected credential ought to be enabled on device 100. For example, financial institution subsystem 350 may be configured to compare any suitable information from commercial pass request data 674 against any suitable information that may be received from bank server 310 (e.g., network-bank data 667), which may enable financial institution subsystem 350 to conclude that device 100 ought to have credential data on SSD 154*b* enabled for selected account credential B. Such comparing may include comparing any password data from commercial pass request data 674 for that selected credential with any associated data known by financial institution subsystem 350 about for that selected credential. This may enable the provisioned but not yet enabled credential data to be validated by financial institution subsystem 350. For example, in response to such validating, financial institution subsystem 350 may be configured to update and/or otherwise complete a link (e.g., in virtual-linking table 352) between a virtual credential that may be enabled on device 100 (e.g., a device primary account number ("D-PAN")) and the selected actual credential (i.e., a funding primary account number ("F-PAN") originally issued by the issuing bank for selected account credential B), such that the D-PAN may be successfully utilized in financial transactions. Additionally or alternatively, in response to such validating, financial institution subsystem 350 may be configured to generate and transmit network pass data 676 (e.g., "ResumeResponse" data) back to commercial entity subsystem 400 and, thus, to device 100, at step 626. For example, financial institution subsystem 350 may generate and transmit one or more "ResumeResponses" as at least a portion of network pass data 676 to commercial entity subsystem 400. In some embodiments, such ResumeResponse network pass data 676 may include the primary account number (e.g., D-PAN or F-PAN, hashed or not), an SSD identifier, and/or an SSD counter, and/or any other suitable data that may be used by device 100 to update the credential data as enabled and activated on device 100. Then, in response to receiving such ResumeResponse network pass data 676, commercial entity subsystem 400 may generate and transmit at least a portion of commercial pass data 678 (e.g., as a "ResumeResponse" command) to device 100 at step 628 that may include one or more persoScripts or GlobalPlatform application protocol data unit ("APDU") scripts (e.g., any scripts, any rotate keys (e.g., if necessary), and/or any other suitable administrative elements that may be used to enable a provisioned credential as a usable PAN on device 100). For example, such data may include password data usable by device 100 (e.g., password data that may be based on any password information from app response data 668). Next, in response to receiving such a ResumeResponse from commercial entity subsystem 400 at step 628, device 100 may enable and/or otherwise activate the credential data of SSD 154*b* based on any suitable data from the ResumeResponse of data 678 for enabling the provisioned but disabled credential (e.g., for toggling the credential from disabled/pending activation to enabled/active for use). For example, at step 630 of process 600, device application 103 may process the received ResumeResponse from commercial pass data 678 and may then generate and send SE pass data 680 (e.g., as an "EnablePass") at step 630 to an SSD 154 of NFC memory module 150 (e.g., to a particular SSD 154 that may be identified by the received ResumeResponse (e.g., SSD 154*b*)). In such embodiments, SSD 154*b* may receive such SE pass data 680 and update credential information on secure element 145 at step 632 (e.g., by enabling the credential data that may be populating SSD 154*b*). In response to such an update at step 632, secure element 145 (e.g., a CRS application) may be configured to generate and share SE pass confirmation data 684 with device application 103 at step 634 that may be indicative of such an update of SSD 154*b* with an enabled pass. In response to receiving such SE pass confirmation data 684 at step 634, device application 103 may be configured to generate and share device pass confirmation data 686 with bank application 113 at step 636 that may be indicative of such an update of SSD 154*b* with an enabled pass. Thereafter, bank application 113 may use such device pass confirmation data 686 to provide updated credential management option data 688 to a user of bank application 113 at step 638 that may be indicative of such an update of SSD 154*b* with an enabled pass (e.g., as shown by an updated device status adjacent option 1005*b* of screen 190*c* of FIG. 10C for newly enabled account credential B).

Such "ResumeResponse" network pass data 676 may be generated and transmitted by financial institution subsystem 350 for immediately facilitating the enablement of a provisioned but currently disabled credential pass on secure element 145 when a suitable password for that credential is provided to financial institution subsystem 350 (e.g., as at least a portion of commercial pass request data 674, which may be based on such password data that may be provided via bank server 310 as at least a portion of app response data 668 at step 618). For example, when such a process for enabling a disabled account credential on device 100 is initiated by a user authenticated bank application 113 of bank server 310, and such suitable password data may be provided to financial institution subsystem 350 (e.g., as at least a portion of commercial pass request data 674 via data from device 100), financial institution subsystem 350 may be configured to automatically and/or immediately enable the credential on device 100. Therefore, in some embodiments, suitable password data for enabling a provisioned but disabled credential on device 100 may be provided by bank server 310 to device 100 at step 618 and then forwarded from device 100 to financial institution subsystem 350 via commercial entity subsystem 400 at steps 622/624 for eventual validation by financial institution subsystem 350. Alternatively, in some embodiments, suitable password data for enabling a provisioned but disabled credential on device 100 may be provided by bank server 310 directly to financial institution subsystem 350 at step 617 for validation by financial institution subsystem 350. For example, in response to account authentication at server 310 by a user of device 100 (e.g., via bank application 113 at steps 602-606) and in response to receipt of a selection of provisioned but disabled credential data on device 100 at server 310, server 310 may be configured to communicate any suitable validation request data (e.g., data 667 at step 617) directly to financial institution subsystem 350 (e.g., to a suitable payment network subsystem 360 associated with the selected credential) for enabling appropriate validation of that credential by financial institution subsystem 350. Such data may include any suitable password data, and/or any suitable identification of device 100 (e.g., SSD 154*b*), and/or any suitable identification of account credential B (e.g., F-PAN or associated D-PAN, in any suitable form), and/or any other suitable information. In response to receipt of such validation request data as network-bank data 667 at step 617, financial institution subsystem 350 may be configured to use such data to validate the identified credential for enablement on device 100 and then generate and transmit appropriate ResumeResponse network pass data 676 to device 100 (e.g., directly or via commercial entity subsystem 400 as data 678) for enabling the credential on device 100. In such embodiments, one or more of steps 618-624 of process 600 may not be carried out.

In some embodiments, bank application 113 and/or bank server 310 may be configured to automatically select a credential enablement management option (e.g., at step 614) rather than receiving affirmative selection of such an option by a user of device 100 at step 614. For example, bank application 113 may be configured to automatically communicate with bank server 310 (e.g., at step 616) for initiating a process for enabling a currently provisioned but disabled credential on secure element 145 in response to identifying that option (e.g., at step 612/614). In such embodiments, process 600 may be configured to skip 612 such that bank application 113 may not provide such a credential enablement management option to a user, but may instead proceed with steps 614-638 without providing any interim UI or requiring any user interaction with respect to that credential enablement management option. Such automatic enablement may be allowed due to such user account authentication of steps 602-606.

Therefore, process 600 may provide a more seamless user experience when a user is interfacing with or otherwise using an online resource 113 on device 100, where that online resource 113 may be associated with an account credential that has been provisioned on device 100 but that is not currently enabled, such that the account credential may be enabled/activated on device 100 through limited user interaction with online resource 113. Such management of one or more credentials on a secure element 145 of electronic device 100 through user interaction with an online resource 113 may increase the functionality of the online resource and/or enhance a user's experience with device 100 and its credential management abilities.

In some embodiments, credential management option selection data 664 may be indicative of a selection to delete an existing "enabled" credential from secure element 145. For example, a user may choose option 1001*a* of FIG. 10A at step 614, and then process 600 may include one or more of steps 616-636 in which device 100 may communicate with bank server 310, commercial entity subsystem 400, and/or financial entity subsystem 350 in one or more various ways to delete account credential A as the enabled first SE credential of SSD 154*a* from secure element 145, after which process 600 may provide updated credential management option data 688 based on the credential deletion of one or more of steps 616-636 at step 638 (e.g., by providing screen 190*b* of FIG. 10B that may include a listing of all three account credentials A, B, and C, as well as a listing of the updated status of at least one credential on secure element 145 of device 100, as well as a listing of at least one updated management option for at least one account credential (e.g., updated management option 1003*a* for facilitating the addition of account credential A as a new SE credential (e.g., of SSD 154*a*) on secure element 145 following the recent deletion of that credential from secure element 145, management option 1003*b* for facilitating the enablement of account credential B as the disabled second SE credential of SSD 154*b* on secure element 145, and/or management option 1003*c* for facilitating the addition of account credential C as a new third SE credential (e.g., of a new third SSD 154*c*) on secure element 145)).

In response to credential management selection data 664 identifying account credential A for such a credential deletion embodiment at step 614, process 600 may advance to step 620, where bank application 113 may be configured to process that credential management selection data 664 and appropriately instruct device application 103 with request data 670 at step 620 (e.g., as an API call) to initiate one or more appropriate credential management request processes with commercial entity subsystem 400 for deleting account credential A from secure element 145. Such request data 670 may include any suitable instruction for device application 103 to interact with secure element 145 for marking that credential for deletion (e.g., device application 103 may mark applet instance 153*a* of SSD 154*a* as a candidate for deletion) and/or for removing all information related to that credential from any application interfaces available to device 100 (e.g., a PassBook or wallet application of device 100). In response to receiving such an instruction with request data 670, device application 103 may be configured to interact with secure element 145 and/or any other suitable information accessible by device application 103 on device 100 in order to generate and transmit device pass request data 672 to commercial entity subsystem 400 at step 622. According to this example, such device pass request data 672 may be a process pending command request that may include any suitable information indicative of selected account credential A (e.g., a hashed PAN or any other suitable identifier) as well as any other suitable information that may be useful to commercial entity subsystem 400 for deleting the currently provisioned credential associated with account credential A on device 100 (e.g., an SSD identifier, which may be indicative of SSD 154a of NFC component 120 of device 100 that may currently include data for the provisioned credential, as may be determined by secure element 145 at step 622). Additionally or alternatively, such device pass request data 672 may include any suitable security information associated with the selected credential that may be used by financial institution subsystem 350 for deleting that credential from device 100.

Next, in response to receiving such device pass request data 672 from device 100, commercial entity subsystem 400 may generate and transmit any suitable commercial pass data 678 back to device 100 at step 628. For example, at step 628 of process 600 of FIG. 6, commercial entity subsystem 400 may pull specific data from the received device pass request data 672 (e.g., notification information indicative of the selected credential as marked for deletion) and may generate and transmit any suitable commercial pass data 678 back to device 100 at step 628 that may include a request to device application 103 to remove all state information associated with the identified credential to be deleted. Device application 103 may receive such a request as data 678 and may forward that request to secure element 145 as SE pass data 680 at step 630, which may take the form of a set of GlobalPlatform commands. In such embodiments, SSD 154a may receive such SE pass data 680 and update credential information on secure element 145 at step 632 (e.g., by deleting or at least disabling all credential data that may be populating SSD 154a and/or deleting SSD 154a altogether). In response to such an update at step 632, secure element 145 (e.g., a CRS application) may be configured to generate and share SE pass confirmation data 684 with device application 103 at step 634 that may be indicative of such an update of SSD 154b with a deleted pass. In response to receiving such SE pass confirmation data 684 at step 634, device application 103 may be configured to generate and share device pass confirmation data 686 with bank application 113 at step 636 that may be indicative of such a deleted credential from SSD 154a. Thereafter, bank application 113 may use such device pass confirmation data 686 to provide updated credential management option data 688 to a user of bank application 113 at step 638 that may be indicative of such a credential deletion of SSD 154a (e.g., as shown by an updated device status adjacent option 1003a of screen 190b of FIG. 10B for newly deleted account credential A). Additionally, in some embodiments, commercial entity subsystem 400 may remove all SMP state data and/or any other suitable data that commercial entity subsystem 400 may have associated with the D-PAN and/or F-PAN of that credential data of SSD 154a being deleted. Additionally or alternatively, commercial entity subsystem 400 may generate and transmit request data 674 (e.g., an "unlink request") at step 624 to financial entity subsystem 350 (e.g., to a payment network subsystem 360 that may be associated with the credential being deleted), which may include any suitable identification of the credential being deleted from device 100. In response to receipt of such unlink request data 674, financial entity subsystem 350 may be configured to remove or otherwise edit a previously active link between a D-PAN of the credential being deleted and its associated F-PAN (e.g., in table 352).

Therefore, process 600 may provide a more seamless user experience when a user is interfacing with or otherwise using an online resource 113 on device 100, where that online resource 113 may be associated with an account credential that has been provisioned on device 100, such that the account credential may be disabled and/or deleted from device 100 through limited user interaction with online resource 113. Such management of one or more credentials on a secure element 145 of electronic device 100 through user interaction with an online resource 113 may increase the functionality of the online resource and/or enhance a user's experience with device 100 and its credential management abilities.

After a user of device 100 may select a provided credential management option with credential management option selection data 664 at step 614 (e.g., by selecting one of credential management options 1001a-1001c of screen 190a of FIG. 10A), the remaining steps of process 600 may occur transparent to the user. That is, once the user provides a selection of a provided credential management option at step 614, steps 616-638 may occur without any further user interaction and may seem instantaneous to a user, whereby process 600 may appear to a user as if, after step 614, the status of credential data on secure element 145 has been automatically and/or instantaneously updated (e.g., as if credential data has been automatically and/or instantaneously added to secure element 145, enabled on secure element 145, and/or deleted from secure element 145) and that updated status may be provided to the user along with any new credential management options based on that updating (e.g., by providing one of updated screens 190b-190d of FIGS. 10B-10D). Therefore, process 600 may provide a more seamless user experience when a user is interfacing with or otherwise using an online resource 113 on device 100, where that online resource 113 may be associated with one or more credentials that have already been at least partially provisioned on device 100 and/or that may be able to be at least partially provisioned on device 100. Such management of one or more credentials on a secure element 145 of electronic device 100 through user interaction with an online resource 113 may increase the functionality of the online resource and/or enhance a user's experience with device 100 and its credential management abilities.

In some embodiments, process 600 may enable a bank server 310 to provision a new credential on secure element 145 (e.g., in response to user selection of user option 1001c for adding a new account credential C). where such a credential may not be associated with any physical card under the control of a user. For example, such a new credential may be a purely digital card, a gift card (e.g., prepaid gift card), or the like that may be offered by a suitable entity for use on device 100. For example, the option to add a new credential C may be for a $100 gift certificate or gift card to a specific merchant (e.g., L.L. Bean), and if a user selects to add such a credential (e.g., at step 614), such a credential representative of $100 that may only be used with a particular merchant may be provisioned on secure element 145 (e.g., through one or more of steps 616-638), where the stored value of that credential may decrease with each use. In some embodiments, selection to add such a new credential may enable a funding account of an authenticated bank account of a user (e.g., as authenticated at step 606) to fund the purchase of such a gift card credential. Such a gift card may only exist on secure element 145 and a physical (e.g., plastic) card may not be generated or mailed to a user for similar use. Any suitable digital only card may be provisioned on secure element 145. Such a digital card may be offered as a user option 1001*c* via any suitable online resource 113, such as a website or application associated with any suitable merchant, and not necessarily a bank, where funding for such a card may be provided by user information provided to the resource 113 during the provisioning process. Commercial entity subsystem 400 may be configured to track or identify the provisioning of such a new digital card, and, in some embodiments, may charge a "finder's fee" or other suitable collection for enabling such a new credential to be created and provisioned on device 100 (e.g., at steps 624/626 or elsewhere).

It is understood that the steps shown in process 600 of FIG. 6 are merely illustrative and that existing steps may be modified or omitted, additional steps may be added, and the order of certain steps may be altered. For example, it is to be understood that some shared keys may be public keys while other shared keys may be private or secret keys (e.g., a mathematically linked key pair that includes a public key and a private key). A public key of a key pair may be used to encrypt data while a private key of that key pair may be used to decrypt the encrypted data. For example, access key 155*a* of SSD 154*a* and/or access key 155*b* of SSD 154*b* and/or access key 155*c* of SSD 154*c*, which may be stored in secure element 145 of device 100, may be a public key while access key 155*a* and/or access key 155*b* and/or access key 155*c* available at commercial entity subsystem 400 may be an associated private key or vice versa. Additionally or alternatively, ISD key 156*k* of ISD 152 that may be stored in a secure element of device 100 may be a public key while ISD key 156*k* available at commercial entity subsystem 400 may be an associated private key or vice versa. Additionally or alternatively, CRS 151*k* that may be stored in a secure element of device 100 may be public while CRS 151*k* available at commercial entity subsystem 400 may be private key or vice versa. Additionally or alternatively, CASD 158*k* that may be stored in a secure element of device 100 may be public while CASD 158*k* available at commercial entity subsystem 400 may be private or vice versa. Additionally or alternatively, credential key 155*a*' of SSD 154*a* and/or credential key 155*b*' of SSD 154*b* and/or credential key 155*c*' of SSD 154*c*, which may be stored in secure element 145 of device 100, may be a public key while credential key 155*a*' and/or credential key 155*b*' and/or credential key 155*c*' available at financial institution subsystem 350 may be an associated private key or vice versa. Moreover, certain data may be signed by a component transmitting that data. For example, data may be signed by device 100 before being transmitted to commercial entity subsystem (e.g., by CASD 158*k*) before being transmitted. Such a signature by device 100 may enable commercial entity subsystem 400 to more confidently determine that such signed data was generated by a trusted device 100. Additionally or alternatively, data may be signed by commercial entity subsystem 400 before being transmitted to device 100. Such a signature by commercial entity subsystem 400 may enable device 100 to more confidently determine that data was generated by a trusted commercial entity subsystem 400. It is to be understood that device 100 need not be configured to handle NFC communications or any other contactless proximity-based communications with another device (e.g., an NFC communication 15 with a merchant terminal of merchant subsystem 200). Instead, device 100 may include a secure element for storing credential information that may be used for online transactions, such as with an online resource that may be managed or otherwise controlled by a merchant subsystem.

Figure 7:
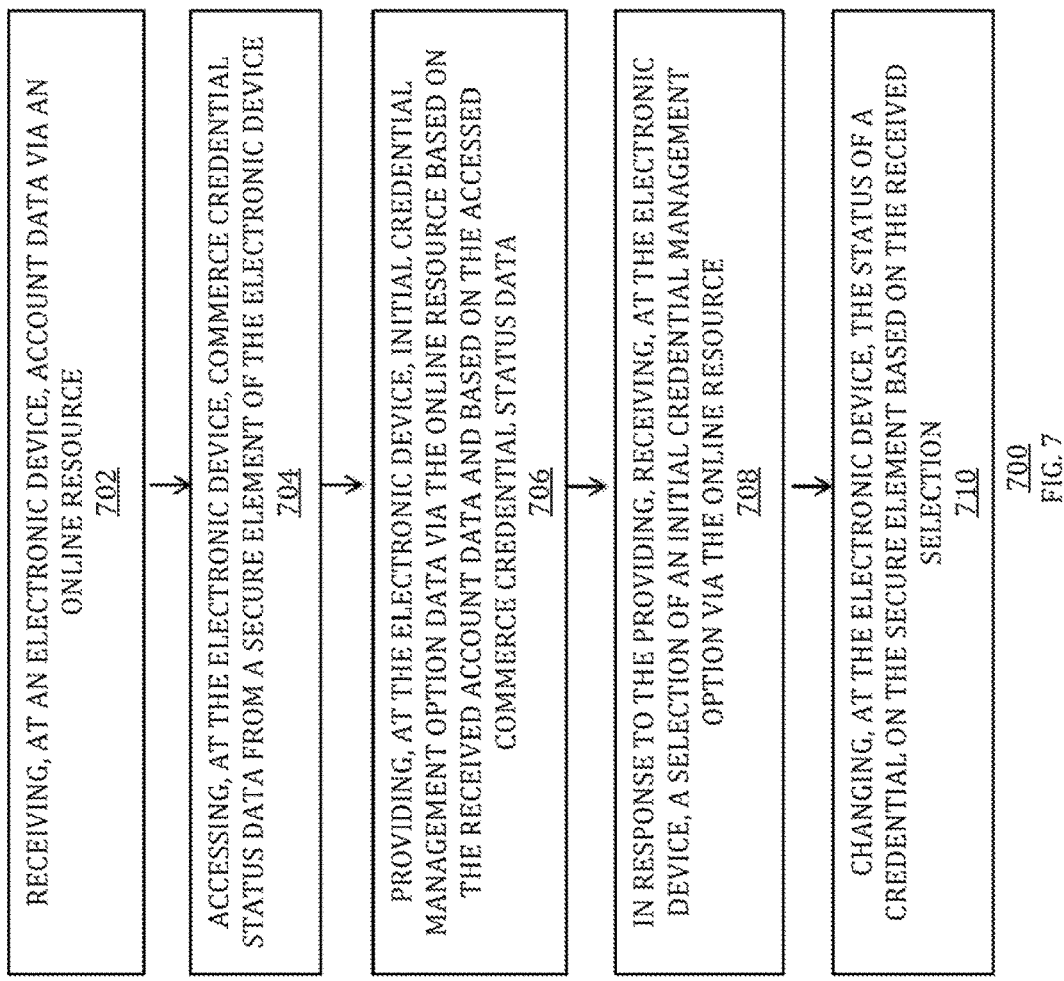

Description of FIG. 7

FIG. 7 is a flowchart of an illustrative process 700 for managing credentials on an electronic device. At step 702, process 700 may include receiving account data via an online resource at an electronic device. For example, device 100 may receive user account data 656 from bank server 310. Next, at step 704, process 700 may include accessing, with the electronic device, commerce credential status data from a secure element of the electronic device. For example, device 100 may access list response data 660 from secure element 145. Next, at step 706, process 700 may include providing initial credential management option data via the online resource at the electronic device based on the received account data and based on the accessed commerce credential status data. For example, device 100 may provide credential management option data 662 based on user account data 656 and list response data 660. Next, in response to the providing of step 706, process 700 may include, at step 708, receiving a selection of an initial credential management option via the online resource at the electronic device. For example, electronic device 100 may identify credential management option selection data 664. Next, at step 710, process 700 may include changing the status of a credential on the secure element based on the received selection of step 708. For example, electronic device 100 may update an activation state of a commerce credential of secure element 145 based on credential management option selection data 664.

It is understood that the steps shown in process 700 of FIG. 7 are merely illustrative and that existing steps may be modified or omitted, additional steps may be added, and the order of certain steps may be altered.

Figure 8:
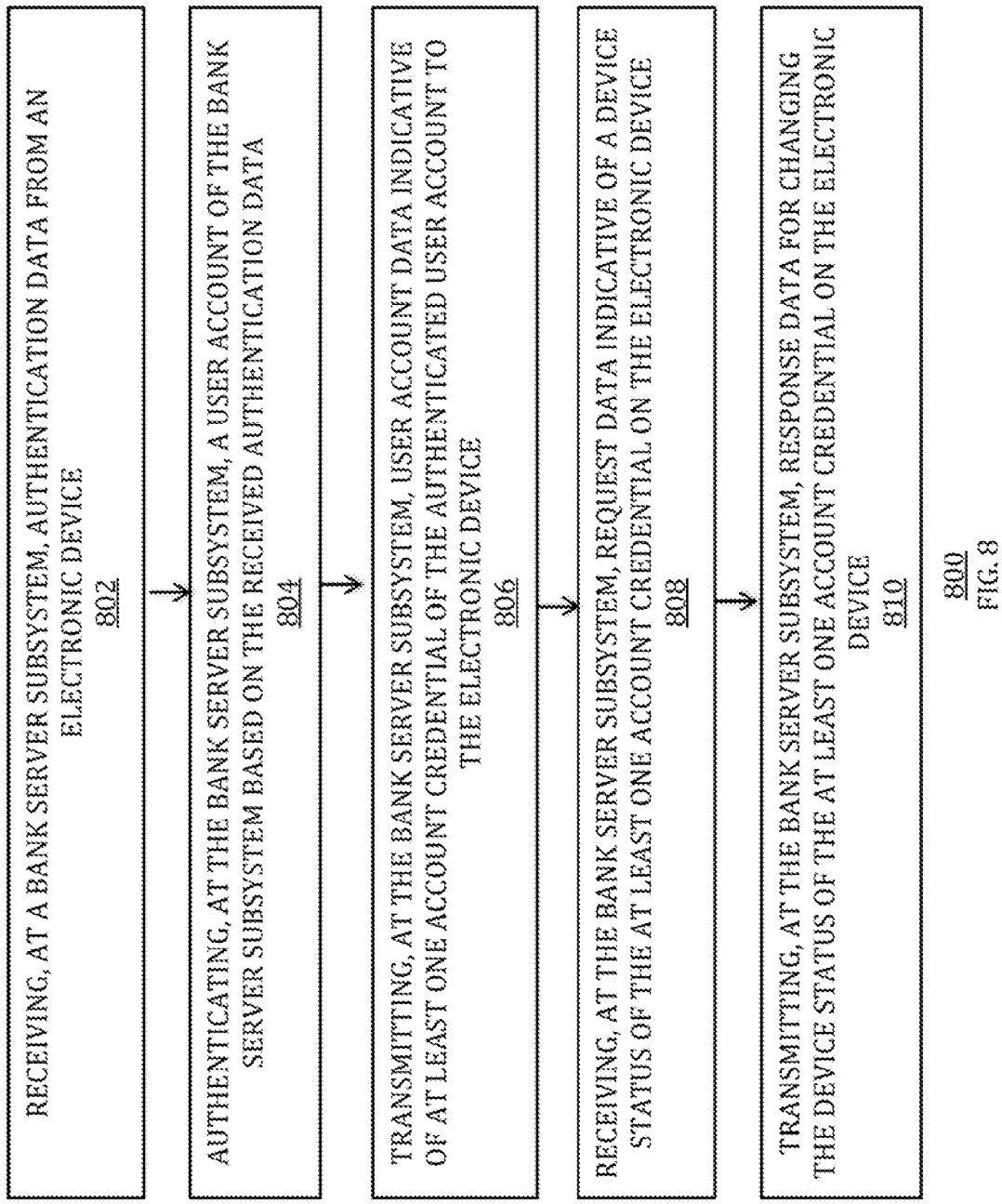

Description of FIG. 8

FIG. 8 is a flowchart of an illustrative process 800 for managing credentials on an electronic device. At step 802, process 800 may include receiving, with a bank server subsystem, authentication data from an electronic device. For example, bank server 310 may receive authentication data 654 from device 100. Next, at step 804, process 800 may include authenticating, with the bank server subsystem, a user account of the bank server subsystem based on the received authentication data. For example, bank server 310 may authenticate a user account based on authentication data 652. Next, at step 806, process 800 may include transmitting, with the bank server subsystem, user account data indicative of at least one account credential of the authenticated user account to the electronic device. For example, bank server 310 may transmit user account data 656 of an authenticated user account to device 100. Next, at step 808, process 800 may include receiving, with the bank server subsystem, request data indicative of a device status of the at least one account credential on the electronic device. For example, bank server 310 may receive app request data 666 that may be indicative of a status of at least one account credential on secure element 145. Then, at step 810, process 800 may include transmitting, with the bank server subsystem, response data for changing the device status of the at least one account credential on the electronic device. For example, bank server 310 may transmit network-bank data 667 and/or app response data 668 for changing a status of an account credential on secure element 145 of device 100.

It is understood that the steps shown in process 800 of FIG. 8 are merely illustrative and that existing steps may be modified or omitted, additional steps may be added, and the order of certain steps may be altered.

Description of FIG. 9

FIG. 9 is a flowchart of an illustrative process 900 for managing credentials on an electronic device. At step 902, process 900 may include receiving, at an electronic device, authenticated user account data from a bank subsystem, wherein the authenticated user account data is indicative of at least one account credential. For example, electronic device 100 may receive user account data 656 from bank server 310. Next, at step 904, process 900 may include identifying, at the electronic device, the status of each of the at least one account credential on a secure element of the electronic device. For example, device 100 may generate list response data 660. Next, at step 906, process 900 may include providing, at the electronic device, credential management option data based on the identified status to a user of the electronic device via an online resource of the bank subsystem. For example, device 100 may provide credential management option data 662 to a user of device 100 via bank application 113.

It is understood that the steps shown in process 900 of FIG. 9 are merely illustrative and that existing steps may be modified or omitted, additional steps may be added, and the order of certain steps may be altered.

Further Description of FIG. 1, FIG. 1A, FIG. 2, FIG. 3, and FIG. 4

Although not shown, commercial entity subsystem 400 of FIG. 1A may be a secure platform system and may include a secure mobile platform ("SMP") broker component, an SMP trusted services manager ("TSM") component, an SMP crypto services component, an identity management system ("IDMS") component, a fraud system component, a hardware security module ("HSM") component, and/or a store component. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350. The components of commercial entity subsystem 400 may interact with each other and collectively with both financial institution subsystem 350 and electronic device 100 for providing a new layer of security and/or for providing a more seamless user experience.

An SMP broker component of commercial entity subsystem 400 may be configured to manage user authentication with a commercial entity user account. Such an SMP broker component may also be configured to manage the life cycle and provisioning of credentials on device 100. An SMP broker component may be a primary end point that may control the user interface elements (e.g., elements of GUI 180) on device 100. An operating system or other application of device 100 (e.g., application 103, application 113, and/or application 143) may be configured to call specific application programming interfaces ("APIs") and an SMP broker component may be configured to process requests of those APIs and respond with data that may derive the user interface of device 100 and/or respond with application protocol data units ("APDUs") that may communicate with secure element 145 of NFC component 120 (e.g., via a communication path 65 between commercial entity subsystem 400 and electronic device 100). Such APDUs may be received by commercial entity subsystem 400 from financial institution subsystem 350 via a trusted services manager ("TSM") of system 1 (e.g., a TSM of a communication path 55 between commercial entity subsystem 400 and financial institution subsystem 350). An SMP TSM component of commercial entity subsystem 400 may be configured to provide GlobalPlatform-based services that may be used to carry out operations on device 100 in concert with financial institution subsystem 350. GlobalPlatform, or any other suitable secure channel protocol, may enable such an SMP TSM component to properly communicate and/or provision sensitive account data between secure element 145 of device 100 and a TSM for secure data communication between commercial entity subsystem 400 and financial institution subsystem 350.

An SMP TSM component of commercial entity subsystem 400 may be configured to use an HSM component of commercial entity subsystem 400 to protect its keys and generate new keys. An SMP crypto services component of commercial entity subsystem 400 may be configured to provide key management and cryptography operations that may be required for user authentication and/or confidential data transmission between various components of system 1. Such an SMP crypto services component may utilize an HSM component of commercial entity subsystem 400 for secure key storage and/or opaque cryptographic operations. A payment crypto service of an SMP crypto services component of commercial entity subsystem 400 may be configured to interact with an IDMS component of commercial entity subsystem 400 to retrieve on-file credit cards or other types of commerce credentials associated with user accounts of the commercial entity. Such a payment crypto service may be configured to be the only component of commercial entity subsystem 400 that may have clear text (i.e., non-hashed) information describing commerce credentials (e.g., credit card numbers) of its user accounts in memory. A commercial entity fraud system component of commercial entity subsystem 400 may be configured to run a commercial entity fraud check on a commerce credential based on data known to the commercial entity about the commerce credential and/or the user (e.g., based on data (e.g., commerce credential information) associated with a user account with the commercial entity and/or any other suitable data that may be under the control of the commercial entity and/or any other suitable data that may not be under the control of financial institution subsystem 350). Such a commercial entity fraud system component of commercial entity subsystem 400 may be configured to determine a commercial entity fraud score for the credential based on various factors or thresholds. Additionally or alternatively, commercial entity subsystem 400 may include a store component, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.). As just one example, such a store component of commercial entity subsystem 400 may be configured to manage and provide an application 113 to device 100 (e.g., via communications path 65), where application 113 may be any suitable application, such as a banking application, an e-mail application, a text messaging application, an internet application, or any other suitable application. Any suitable communication protocol or combination of communication protocols may be used by commercial entity subsystem 400 to communicate data amongst the various components of commercial entity subsystem 400 and/or to communicate data between commercial entity subsystem 400 and other components of system 1 (e.g., financial institution subsystem 350 via communications path 55 of FIG. 1A and/or electronic device 100 via communications path 65 of FIG. 1A).

As mentioned, and as shown in FIG. 2, electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to conducting financial transactions) and, in other embodiments, electronic device 100 may perform multiple functions (e.g., a device that conducts financial transactions, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., one or more subsystems or other components of system 1) using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103, an application 113, and/or an application 143. Each application 103/113/143 may include, but is not limited to, one or more operating system applications, firmware applications, media playback applications, media editing applications, NFC low power mode applications, biometric feature-processing applications, or any other suitable applications. For example, processor 102 may load application 103/113/143 as a user interface program to determine how instructions or data received via an input component 110 or other component of device 100 may manipulate the way in which information may be stored and/or provided to the user via an output component 112. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications 5 between electronic device 100 and merchant subsystem 200 (e.g., a merchant payment terminal). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 370 Mbps), and may comply with any suitable standards, such as the TransferJet™ protocol. Communication between NFC component 120 and merchant subsystem 200 may occur within any suitable close range distance between device 100 and merchant subsystem 200 (see, e.g., distance D of FIG. 1A), such as a range of approximately 2 to 4 centimeters, and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFID") circuitry. NFC component 120 may provide a manner of acquiring merchandise information, transferring payment information, and otherwise communicating with an external device (e.g., terminal 220 of merchant subsystem 200).

NFC component 120 may include any suitable modules for enabling contactless proximity-based communication 5 between electronic device 100 and merchant subsystem 200. As shown in FIG. 2, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to merchant subsystem 200 as part of a contactless proximity-based or NFC communication 5. Additionally or alternatively, NFC data module 132 may be configured to contain, route, or otherwise receive any suitable data that may be received by NFC component 120 from merchant subsystem 200 as part of a contactless proximity-based communication 5.

NFC transceiver or NFC antenna 134 may be any suitable antenna or other suitable transceiver circuitry that may generally enable communication of communication 5 from NFC data module 132 to merchant subsystem 200 and/or to NFC data module 132 from subsystem 200. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, cellular, or GPS communication between electronic device 100 and another remote entity, while NFC component 120 may leverage antenna 116 to enable contactless proximity-based or NFC communication 5 between NFC data module 132 of NFC device module 130 and another entity (e.g., merchant subsystem 200). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication 5 to subsystem 200. For example, shared antenna 116 may require amplification from booster 136 before antenna 116 (e.g., a non-loop antenna) may be properly enabled for communicating contactless proximity-based or NFC communication 5 between electronic device 100 and merchant subsystem 200 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating NFC communication 5 between electronic device 100 and merchant subsystem 200. NFC processor module 142 may exist as a separate component, may be integrated into another chipset, or may be integrated with processor 102, for example, as part of a system on a chip ("SoC"). As shown in FIG. 2, NFC processor module 142 of NFC controller module 140 may be used to run one or more applications, such as an NFC low power mode or wallet application 143 that may help dictate the function of NFC component 120. Application 143 may include, but is not limited to, one or more operating system applications, firmware applications, NFC low power applications, or any other suitable applications that may be accessible to NFC component 120 (e.g., application 103/113). NFC controller module 140 may include one or more protocols, such as the Near Field Communication Interface and Protocols ("NFCIP-1"), for communicating with another NFC device (e.g., merchant subsystem 200). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information (e.g., communication 5) from NFC tags (e.g., from merchant subsystem 200) to NFC data module 132, a peer-to-peer mode for exchanging data (e.g., communication 5) with another NFC enabled device (e.g., merchant subsystem 200), and a card emulation mode for allowing another NFC enabled device (e.g., merchant subsystem 200) to read information (e.g., communication 5) from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., merchant subsystem 200). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 143).

NFC memory module 150 may operate in conjunction with NFC device module 130 and/or NFC controller module 140 to allow for NFC communication 5 between electronic device 100 and merchant subsystem 200. NFC memory module 150 may be embedded within NFC device hardware or within an NFC integrated circuit ("IC"). NFC memory module 150 may be tamper resistant and may provide at least a portion of a secure element. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC controller module 140 and NFC memory module 150 may independently or in combination provide at least a portion of a secure element 145, which may be tamper resistant. For example, such a secure element 145 may be configured to provide a tamper-resistant platform (e.g., as a single or multiple chip secure microcontroller) that may be capable of securely hosting applications and their confidential and cryptographic data (e.g., applet 153 and key 155) in accordance with rules and security requirements that may be set forth by a set of well-identified trusted authorities (e.g., an authority of financial institution subsystem and/or an industry standard, such as GlobalPlatform). NFC memory module 150 may be a portion of memory 106 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems. Secure element 145 may be a highly secure, tamper-resistant hardware component within a chip, which may be used for storing sensitive data or applications on electronic device 100. At least a portion of secure element 145 may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively or additionally, at least a portion of secure element 145 may be provided in an integrated circuit that may be embedded into electronic device 100 during manufacturing of device 100. Alternatively or additionally, at least a portion of secure element 145 may be provided in a peripheral device that can be plugged into, inserted into, or otherwise coupled to electronic device 100, such as a micro secure digital ("SD") memory card As shown in FIG. 2, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., commercial entity subsystem 400 and/or financial institution subsystem 350) may store keys and/or other suitable information for creating or otherwise provisioning one or more credentials (e.g., commerce credentials associated with various credit cards, bank cards, gift cards, access cards, transit passes, digital currency (e.g., bitcoin and associated payment networks), etc.) on electronic device 100 (e.g., via communications component 106), for credential content management, and/or for security domain management. A specific supplemental security domain ("SSD") 154 (e.g., SSD 154*a*) may be associated with a particular TSM and at least one specific commerce credential (e.g., a specific credit card credential or a specific public transit card credential) that may provide specific privileges or payment rights to electronic device 100. For example, a first payment network subsystem 360 (e.g., Visa) may be the TSM for first SSD 154*a* and applet 153*a* of first SSD 154*a* may be associated with a commerce credential managed by that first payment network subsystem 360, while a second payment network subsystem 360 (e.g., MasterCard) may be the TSM for another SSD 154*b*.

Security features may be provided for enabling use of NFC component 120 (e.g., for enabling activation of commerce credentials provisioned on device 100) that may be particularly useful when transmitting confidential payment information, such as credit card information or bank account information of a credential, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area (e.g., for a user to alter a life cycle state of a security domain element of the secure element). In certain embodiments, some or all of the security features may be stored within NFC memory module 150. Further, security information, such as an authentication key, for communicating with subsystem 200 may be stored within NFC memory module 150. In certain embodiments, NFC memory module 150 may include a microcontroller embedded within electronic device 100.

Terminal 220 of merchant subsystem 200 of FIG. 1A may include a reader for detecting, reading, or otherwise receiving NFC communication 15 from electronic device 100 (e.g., when electronic device 100 comes within a certain distance or proximity D of terminal 220). Accordingly, it is noted that NFC communication 15 between terminal 220 and electronic device 100 may occur wirelessly and, as such, may not require a clear "line of sight" between the respective devices. As mentioned, NFC device module 130 may be passive or active. When passive, NFC device module 130 may only be activated when within a response range D of a suitable reader of terminal 220. For instance, a reader of terminal 220 may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., credit card credential information) from NFC data module 132, via antenna 116 or antenna 134, to terminal 220 as NFC communication 15. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., credit card credential information) from NFC data module 132, via antenna 116 or antenna 134, to terminal 220 as NFC communication 15, rather than reflect radio frequency signals, as in the case of a passive NFC device module 130. Terminal 220 may be provided by a merchant of merchant subsystem 200 (e.g., in a store of the merchant for selling products or services directly to the user of device 100 at the store). While NFC component 120 has been described with respect to near field communication, it is to be understood that component 120 may be configured to provide any suitable contactless proximity-based mobile payment or any other suitable type of contactless proximity-based communication 15 between electronic device 100 and terminal 220. For example, NFC component 120 may be configured to provide any suitable short-range communication, such as those involving electromagnetic/electrostatic coupling technologies.

While NFC component 120 has been described with respect to near field communication, it is to be understood that component 120 may be configured to provide any suitable contactless proximity-based mobile payment or any other suitable type of contactless proximity-based communication 5 between electronic device 100 and merchant subsystem 200. For example, NFC component 120 may be configured to provide any suitable short-range communication, such as those involving electromagnetic/electrostatic coupling technologies.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

As mentioned, and as shown in FIG. 4, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently miming application (e.g., application 103 and/or application 113 and/or application 143) that may be displayed in all or some of the areas of display output component 112a. For example, as shown in FIG. 4, GUI 180 may be configured to display a first screen 190. One or more of user input components 110a-110i may be used to navigate through GUI 180. For example, one user input component 110 may include a scroll wheel that may allow a user to select one or more graphical elements or icons 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with a "Merchant App" textual indicator 181 (i.e., specific icon 183) is selected, device 100 may launch or otherwise access a specific merchant application and may display screens of a specific user interface that may include one or more tools or features for interacting with device 100 in a specific manner. For each application, screens may be displayed on display output component 112a and may include various user interface elements (e.g., screens 190a-190d of FIGS. 10A-10D). Additionally or alternatively, for each application, various other types of non-visual information may be provided to a user via various other output components 112 of device 100. The operations described with respect to various GUIs 180 may be achieved with a wide variety of graphical elements and visual schemes. Therefore, the described embodiments are not intended to be limited to the precise user interface conventions adopted herein. Rather, embodiments may include a wide variety of user interface styles.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, Calif. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one haptic or tactile output component 112c (e.g., a rumbler), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 4, at least a portion of biometric input component 110i may be incorporated into or otherwise combined with input component 110a or any other suitable input component 110 of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to subsystem 200 via antenna 116 and/or antenna 134 (not shown in FIG. 4). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

Moreover, one, some, or all of the processes described with respect to FIGS. 1-10D may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

As mentioned, an input component 110 of device 100 (e.g., input component 1100 may include a touch input component that can receive touch input for interacting with other components of device 100 via wired or wireless bus 118. Such a touch input component 110 may be used to provide user input to device 100 in lieu of or in combination with other input components, such as a keyboard, mouse, and the like.

A touch input component 110 may include a touch sensitive panel, which may be wholly or partially transparent, semitransparent, non-transparent, opaque, or any combination thereof. A touch input component 110 may be embodied as a touch screen, touch pad, a touch screen functioning as a touch pad (e. LY a touch screen replacing the touchpad of a laptop), a touch screen or touch pad combined or incorporated with any other input device (e.g., a touch screen or touch pad disposed on a keyboard), or any multi-dimensional object having a touch sensitive surface for receiving touch input. In some embodiments, the terms touch screen and touch pad may be used interchangeably.

In some embodiments, a touch input component 110 embodied as a touch screen may include a transparent and/or semitransparent touch sensitive panel partially or wholly positioned over, under, and/or within at least a portion of a display (e.g., display output component 112a). In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures. A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

As mentioned, electronic device 100 may drive a display (e.g., display output component 112a) with graphical data to display a graphical user interface ("GUI") 180. GUI 180 may be configured to receive touch input via a touch input component 110f. Embodied as a touch screen (e.g., with display output component 112a as I/O component 114a), touch I/O component 110f may display GUI 180. Alternatively, GUI 180 may be displayed on a display (e.g., display output component 112a) separate from touch input component 110f GUI 180 may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110f, which may be associated with the graphical elements of GUI 180. In other embodiments, the user may perform gestures at one or more locations that are independent of the locations of graphical elements of GUI 180. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. Alternatively, when gestures are performed directly on a touch screen, a user may interact directly with objects on the touch screen, with or without a cursor or pointer being displayed on the touch screen. Feedback may be provided to the user via bus 118 in response to or based on the touch or near touches on a touch input component 110. Feedback may be transmitted optically, mechanically, electrically, olfactory, acoustically, or the like or any combination thereof and in a variable or non-variable manner.

Further Applications of Described Concepts

While there have been described systems, methods, and computer-readable media for managing credentials on an electronic device using an online resource, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method comprising:
at an electronic device comprising a secure element on which at least one device credential is provisioned:
receiving authenticated user account data of an authenticated user account of a user with a remote subsystem, from the remote subsystem, remote from the electronic device, via an online resource accessed by the electronic device, wherein, for each account credential of at least one account credential of the authenticated user account, the received authenticated user account data comprises account credential information indicative of that account credential;

accessing commerce credential status data from the secure element of the electronic device, wherein, for each device credential of at least a subset of the at least one device credential provisioned on the secure element, the accessed commerce credential status data comprises device credential information indicative of that device credential;

comparing the account credential information, for each account credential of the at least one account credential of the authenticated user account, of the received account data with the device credential information, for each device credential of at least the subset of the at least one device credential provisioned on the secure element, of the accessed commerce credential status data;

providing initial credential management option data via the online resource based on the comparing;

in response to the providing, receiving a selection of an initial credential management option via the online resource; and changing the status of a particular device credential of the at least one device credential provisioned on the secure element based on the received selection.

2. The method of claim 1, further comprising, prior to the receiving the account data, authenticating a user of the electronic device at the remote subsystem with the online resource.

3. The method of claim 1, further comprising, prior to the receiving the account data, at the electronic device:
receiving user authentication data; and
transmitting the received user authentication data to the remote subsystem, wherein the received account data is received from the remote subsystem based on the transmitted user authentication data.

4. The method of claim 3, wherein the online resource comprises one of an online application that is at least partially controlled by the remote subsystem or a website that is at least partially controlled by the remote subsystem.

5. The method of claim 1, wherein the accessing comprises accessing the commerce credential status data from each security domain of the secure element that is associated with an application identifier of the online resource.

6. The method of claim 1, further comprising providing updated credential management option data via the online resource based on the changed status of the particular device credential.

7. The method of claim 1, wherein the changing comprises one of:
adding a new credential on the secure element;
enabling a disabled credential on the secure element; or
deleting an existing credential from the secure element.

8. The method of claim 1, wherein the changing comprises, at the electronic device:
receiving password data from the remote subsystem associated with the online resource;
transmitting the password data to a payment network subsystem associated with the credential; and
receiving pass data from the payment network subsystem that enables the credential on the secure element.

9. The method of claim 1, wherein the comparing comprises identifying from the received account data a particular account credential of the at least one account credential that is not associated with the accessed commerce credential status data, and wherein the providing the initial credential management option data comprises providing the initial credential management option that facilitates addition of the particular account credential on the secure element.

10. The method of claim 1, wherein the comparing comprises identifying from the received account data a particular account credential of the at least one account credential that is associated with a disabled credential of the accessed commerce credential status data, and wherein the providing the initial credential management option data comprises providing the initial credential management option that facilitates enablement of the particular account credential on the secure element.

11. An electronic device comprising:
a communication component;
an application processor operative to access an online resource of a bank server; and
a secure element operative to store commerce credential data for at least one device commerce credential, wherein:
the application processor is operative to receive account data from the bank server via the communication component comprising a bank primary account number for each account credential of at least one account credential of a user account authenticated by the bank server for a user of the online resource accessed by the application processor of the electronic device;
the application processor is operative to obtain a status and a device primary account number for each device commerce credential of the at least one device commerce credential of the commerce credential data from the secure element;
the application processor is operative to provide initial credential management option data to the user via the online resource based on a comparison of the bank primary account number for each account credential of the at least one account credential of the received account data and the obtained device primary account number for each device commerce credential of the at least one device commerce credential;
the application processor is operative to receive a selection of an initial credential management option of the provided initial credential management option data from the user via the online resource; and
the secure element is operative to change the status of a particular device commerce credential of the commerce credential data on the secure element based on the received selection.

12. The electronic device of claim 11, wherein the application processor is operative to provide updated credential management option data via the online resource based on the changed status of the particular device commerce credential.

13. The electronic device of claim 11, further comprising an input/output ("I/O") interface, wherein:
the application processor is operative to provide the initial credential management option data on the I/O interface to the user of the electronic device; and
the application processor is operative to receive the selection of the initial credential management option on the I/O interface from the user.

14. The electronic device of claim 11, wherein the initial credential management option data comprises:
a listing of an identification of at least a particular one of the at least one account credential of the user account that is managed by the bank server;
a listing of a device status for each of the at least a particular one of the at least one account credential with respect to the commerce credential data from the secure element; and a listing of a credential management option for each of the at least a particular one of the at least one account credential based on the listed device status for that account credential.

15. The electronic device of claim 11, wherein the secure element is operative to change the status of the particular device commerce credential based on password data received from the bank server via the communication component.

16. A method comprising:
at a bank server subsystem:
receiving authentication data from an electronic device;
authenticating a user account of the bank server subsystem based on the received authentication data;
transmitting user account data indicative of at least one account credential of the authenticated user account to the electronic device;
after transmitting the user account data, receiving request data, from the electronic device, that is indicative of a device status of a device credential on a secure element of the electronic device, wherein the device credential is associated with one of the at least one account credential indicated by the transmitted user account data, and wherein the device status of the device credential is not affected by the transmitted user account data; and
after receiving the request data, transmitting response data for changing the device status of the device credential on the electronic device, wherein the response data comprises an account number of the one of the at least one account credential encrypted with a key from the received request data.

17. The method of claim 16, wherein the device status of the device credential on the electronic device comprises one of disabled or missing.

18. The method of claim 16, wherein the response data comprises password data associated with the device credential.

19. A method comprising:
at a bank server subsystem:
receiving authentication data from an electronic device;
authenticating a user account of the bank server subsystem based on the received authentication data;
transmitting user account data indicative of at least one account credential of the authenticated user account to the electronic device;
receiving request data indicative of a device status of the at least one account credential on the electronic device; and
transmitting response data for changing the device status of the at least one account credential on the electronic device, wherein:
the received request data comprises a certificate chain; and
the method further comprises:
at the bank server subsystem:
validating at least a first portion of the certificate chain;
enveloping an account number of the at least one account credential with at least a second portion of the certificate chain; and
providing the enveloped account number as at least a portion of the response data.

20. A method comprising:
at an electronic device comprising a secure element:
storing device primary account number data for each device credential of at least one device credential on the secure element;
receiving authenticated user account data from a bank subsystem, wherein the authenticated user account data comprises bank primary account number data for each account credential of at least one account credential of a user account authenticated by the bank subsystem for a user of the electronic device;
identifying the status of each of the at least one account credential on the secure element by comparing the bank primary account number data of the received authenticated user account data with the device primary account number data stored on the secure element;
providing credential management option data based on the identified status to the user of the electronic device via an online resource of the bank subsystem;
receiving at the electronic device a selection of a management option of the provided credential management option data; and
changing the status of a particular one of the at least one device credential on the secure element based on the received selection, wherein the changing comprises:
transmitting request data comprising identification of the particular one of the at least one device credential from the electronic device to the bank subsystem; and
receiving password data at the electronic device from the bank subsystem based on the request data.

21. A method comprising:
at an electronic device comprising a secure element on which at least one device credential is provisioned:
comparing authenticated user account data of an authenticated user account with a remote subsystem, as received by the electronic device from the remote subsystem via an online resource running on the electronic device, with commerce credential data stored on the secure element of the electronic device; and
providing at least one commerce credential management option via the online resource running on the electronic device to a user of the electronic device based on the comparing, wherein:
for each account credential of at least one account credential of the authenticated user account, the received authenticated user account data comprises account credential information indicative of that account credential;
for each device credential of at least a subset of the at least one device credential provisioned on the secure element, the commerce credential data comprises device credential information indicative of that device credential; and
the comparing comprises comparing the account credential information, for each account credential of the at least one account credential of the authenticated user account, of the received authenticated user account data with the device credential information, for each device credential of at least the subset of the at least one device credential provisioned on the secure element, of the commerce credential data.

22. The method of claim 21, wherein the at least one commerce credential management option is associated with adding a new commerce credential identified by the received account data to the secure element.

23. The method of claim 21, wherein the at least one commerce credential management option is associated with enabling a commerce credential provisioned on the secure element and identified by the received account data.

24. The method of claim 21 further comprising:
receiving at the electronic device a selection of a management option of the provided at least one commerce credential management option; and
changing the status of a credential stored on the secure element based on the received selection, wherein the changing comprises:
transmitting request data comprising identification of the credential from the electronic device to the remote subsystem; and
receiving password data at the electronic device from the remote subsystem based on the transmitted request data.

25. A non-transitory computer-readable medium comprising computer-readable instructions recorded thereon for:
receiving authenticated user account data at an electronic device from a bank subsystem, wherein the authenticated user account data comprises bank primary account number data for each account credential of at least one account credential of a user account authenticated by the bank server for a user of the electronic device;
identifying the status of each of the at least one account credential on a secure element of the electronic device by comparing the bank primary account number data of the received authenticated user account data with device primary account number data stored on the secure element;
providing credential management option data based on the identified status to the user of the electronic device;
receiving at the electronic device a selection of a management option of the provided credential management option data; and
changing the status of a particular one of the at least one account credential on the secure element based on the received selection, wherein the changing comprises:
transmitting request data comprising identification of the particular one of the at least one account credential from the electronic device to the bank subsystem; and
receiving password data at the electronic device from the bank subsystem based on the transmitted request data.

26. The non-transitory computer-readable medium of claim 25, wherein the credential management option data comprises an option for facilitating enablement of the at least one account credential on the secure element.

* * * * *